United States Patent
Fernald et al.

(10) Patent No.: US 10,514,747 B2
(45) Date of Patent: Dec. 24, 2019

(54) LOW-POWER COMMUNICATION APPARATUS WITH WAKEUP DETECTION AND ASSOCIATED METHODS

(71) Applicant: Silicon Laboratories Inc., Austin, TX (US)

(72) Inventors: Kenneth W. Fernald, Austin, TX (US); Thomas Saroshan David, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/869,926

(22) Filed: Sep. 29, 2015

(65) Prior Publication Data

US 2016/0018873 A1    Jan. 21, 2016

Related U.S. Application Data

(63) Continuation-in-part of application No. 14/224,048, filed on Mar. 24, 2014, now Pat. No. 9,713,090, and a continuation-in-part of application No. 14/224,057, filed on Mar. 24, 2014, now Pat. No. 9,886,412.

(51) Int. Cl.
  *G06F 1/3234* (2019.01)
  *G06F 1/3206* (2019.01)
  *H04W 52/02* (2009.01)

(52) U.S. Cl.
  CPC .......... *G06F 1/3234* (2013.01); *G06F 1/3206* (2013.01)

(58) Field of Classification Search
  CPC ..... G06F 1/00; G06F 1/32; G06F 3/00; G06F 13/423; H03B 19/00

USPC ........................................................ 710/18
  See application file for complete search history.

(56) References Cited

U.S. PATENT DOCUMENTS

| | | | |
|---|---|---|---|
| 6,085,325 A | 7/2000 | Jackson | |
| 6,467,042 B1 | 10/2002 | Wright | |
| 6,917,658 B2 | 7/2005 | Fernald | |
| 7,197,578 B1* | 3/2007 | Jacobs | G06F 1/3203 710/14 |
| 7,395,447 B2 | 7/2008 | Prihadi et al. | |
| 7,616,074 B2 | 11/2009 | Toffolon | |
| 7,873,858 B2* | 1/2011 | Sung | G06F 1/04 713/500 |
| 8,003,911 B2 | 8/2011 | Onodera et al. | |

(Continued)

OTHER PUBLICATIONS

U.S. Appl. No. 14/224,048, filed Mar. 2014, Fernald et al.

(Continued)

*Primary Examiner* — Getente A Yimer
(74) *Attorney, Agent, or Firm* — Law Offices of Maximilian R. Peterson

(57) ABSTRACT

An apparatus includes a communication circuit coupled to a communication link, a wakeup detector, and a power control circuit. The communication circuit has a first state and a second state. The power consumption of the communication circuit is lower in the second state than in the first state. The wakeup detector is coupled to the communication link. The wakeup detector generates a wakeup signal to cause the communication circuit to make a transition from the second state to the first state in response to an occurrence of an event on the communication link. The power control circuit selectively supplies power to the communication circuit in response to the wakeup signal.

20 Claims, 16 Drawing Sheets

(56) References Cited

U.S. PATENT DOCUMENTS

| | | | | |
|---|---|---|---|---|
| 8,036,613 | B2* | 10/2011 | Schneckenburger | ........................ G06F 13/4295 455/208 |
| 8,378,724 | B2 | 2/2013 | David et al. | |
| 8,654,112 | B2 | 2/2014 | Hsu | |
| 8,707,068 | B2* | 4/2014 | Saladin | ................. G06F 1/3209 713/310 |
| 9,886,412 | B2* | 2/2018 | Fernald | ............... G06F 11/3048 |
| 2005/0066077 | A1* | 3/2005 | Shibata | ................. G06F 1/3203 710/33 |
| 2006/0043202 | A1 | 3/2006 | Kim | |
| 2007/0205872 | A1* | 9/2007 | Kim | ................. H04W 52/0229 340/10.33 |
| 2008/0079465 | A1 | 4/2008 | Sung | |
| 2009/0210734 | A1* | 8/2009 | Schramm | ............. G06F 13/385 713/324 |
| 2011/0271130 | A1* | 11/2011 | Neuscheler | ............. H04L 12/12 713/323 |
| 2012/0002764 | A1 | 1/2012 | Hsiao | |
| 2013/0212408 | A1* | 8/2013 | Fernald | .................. G06F 1/324 713/300 |
| 2014/0082392 | A1* | 3/2014 | Nishizawa | ............ G06F 1/3234 713/323 |
| 2016/0185578 | A1 | 6/2016 | Manes | |

OTHER PUBLICATIONS

U.S. Appl. No. 14/224,057, filed Mar. 2014, Fernald et al.

*Wake-on-LAN*, Wikipedia article, retrieved Mar. 25, 2016, 10 pgs.

Bosch, *Tutorial for Wake Up Schemes and Requirement for Automotive Communication Networks*, Jun. 24, 2012, 16 pgs.

Office communication in U.S. Appl. No. 14/224,048, dated Aug. 21, 2015, 8 pgs.

Office communication in U.S. Appl. No. 14/224,057, dated Sep. 23, 2015, 10 pgs.

Office communication in U.S. Appl. No. 14/224,057, dated Nov. 21, 2016, 9 pgs.

Office communication in U.S. Appl. No. 14/224,048, dated Oct. 4, 2016, 8 pgs.

Office communication in U.S. Appl. No. 14/224,057, dated Jun. 15, 2016, 10 pgs.

Office communication in U.S. Appl. No. 14/224,048, dated Apr. 20, 2016, 10 pgs.

Office communication in U.S. Appl. No. 14/224,048, dated Mar. 14, 2017, 9 pgs.

Office communication in U.S. Appl. No. 14/224,057, dated Jun. 12, 2017, 12 pgs.

Office communication in U.S. Appl. No. 14/224,057, dated Sep. 22, 2017, 8 pgs.

* cited by examiner

LOW-POWER COMMUNICATION APPARATUS WITH WAKEUP DETECTION AND ASSOCIATED METHODS

CROSS-REFERENCE TO RELATED APPLICATIONS

This application is a continuation-in-part of, and incorporates by reference in their entireties for all purposes, the following applications:

U.S. patent application Ser. No. 14/224,048, filed on Mar. 24, 2014, titled "Low-Power Communication Apparatus and Associated Methods"; and U.S. patent application Ser. No. 14/224,057, filed on Mar. 24, 2014, titled "Communication Apparatus with Improved Performance and Associated Methods".

TECHNICAL FIELD

The disclosure relates generally to communication apparatus and methods and, more particularly, to apparatus for improved-performance communication apparatus, such as universal serial bus (USB) communication apparatus, and associated methods.

BACKGROUND

Typical information or data processing systems or electronic systems include various subsystems or modules. The subsystems or modules may provide various functionality. The modular nature of the system (e.g., using subsystems) affords system designers more flexibility in designing and producing the system.

By their nature, systems typically include apparatus for two or more of the subsystems or modules to communicate together. The communication may occur over buses. One example of such a bus constitutes USB, a ubiquitous serial bus that provides communication between various modules, subsystems, or circuitry in electronic systems, such as data-processing systems, computers, etc.

Since the introduction of USB, a variety of refinements and improvements have been made. An example constitutes U.S. Pat. No. 6,917,658, which discloses a clock recovery method that allows a USB device to operate using an internal oscillator rather than a crystal oscillator (or an internal oscillator frequency locked to a crystal clock).

SUMMARY

In exemplary embodiments, a variety of low-power communication apparatus with wakeup detection and associated methods are contemplated. According to an exemplary embodiment, an apparatus includes a communication circuit coupled to a communication link, a wakeup detector, and a power control circuit. The communication circuit has a first state and a second state. The power consumption of the communication circuit is lower in the second state than in the first state. The wakeup detector is coupled to the communication link. The wakeup detector generates a wakeup signal to cause the communication circuit to make a transition from the second state to the first state in response to an occurrence of an event on the communication link. The power control circuit selectively supplies power to the communication circuit in response to the wakeup signal.

According to another exemplary embodiment, a communication apparatus includes a USB transceiver coupled to a USB communication link that communicates USB signals. The communication apparatus further includes USB circuitry coupled to the USB transceiver to process the USB packets. The USB circuitry has a first state and a second state. The power consumption of the USB circuitry is lower in the second state than in the first state. The communication apparatus further includes a wakeup detector that is coupled to the communication link. The wakeup detector detects an occurrence of an event from the USB signals and to generate a wakeup signal. The communication apparatus further includes a power control circuit that selectively supplies power to the USB circuitry in response to the wakeup signal.

According to another exemplary embodiment, a method is disclosed for operating a communication circuit coupled to a communication link. The communication circuit has a first state and a second state, such that the power consumption of the communication circuit is lower in the second state than in the first state. The method includes causing the communication circuit to enter the second state by controlling a supply of power to the communication circuit. The method further includes examining signals of the communication link to determine whether an event has occurred, and controlling the supply of power to the communication to cause the communication circuit to make a transition from the second state to the first state if the event has occurred.

BRIEF DESCRIPTION OF THE DRAWINGS

The appended drawings illustrate only exemplary embodiments and therefore should not be considered as limiting the scope of the application or the claims. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to communication apparatus and methods, including apparatus for improved-performance communication apparatus, such as USB communication apparatus, and associated methods. More particularly, the disclosure relates to apparatus and methods for reducing power consumption of communication circuitry, such as a USB device.

Reduction of power consumption of communication circuitry may be accomplished by using one or both of the following techniques: (a) reducing power when the communication bus (e.g., a USB bus) is in an idle state; or (b) during periods when information is communicated via the bus (e.g., incoming traffic on a USB bus) that will not be accepted by the device or will be rejected by the device. For each of the above scenarios (idle bus and rejected traffic) the power savings includes two parts, as discussed below in detail.

Figure 1:
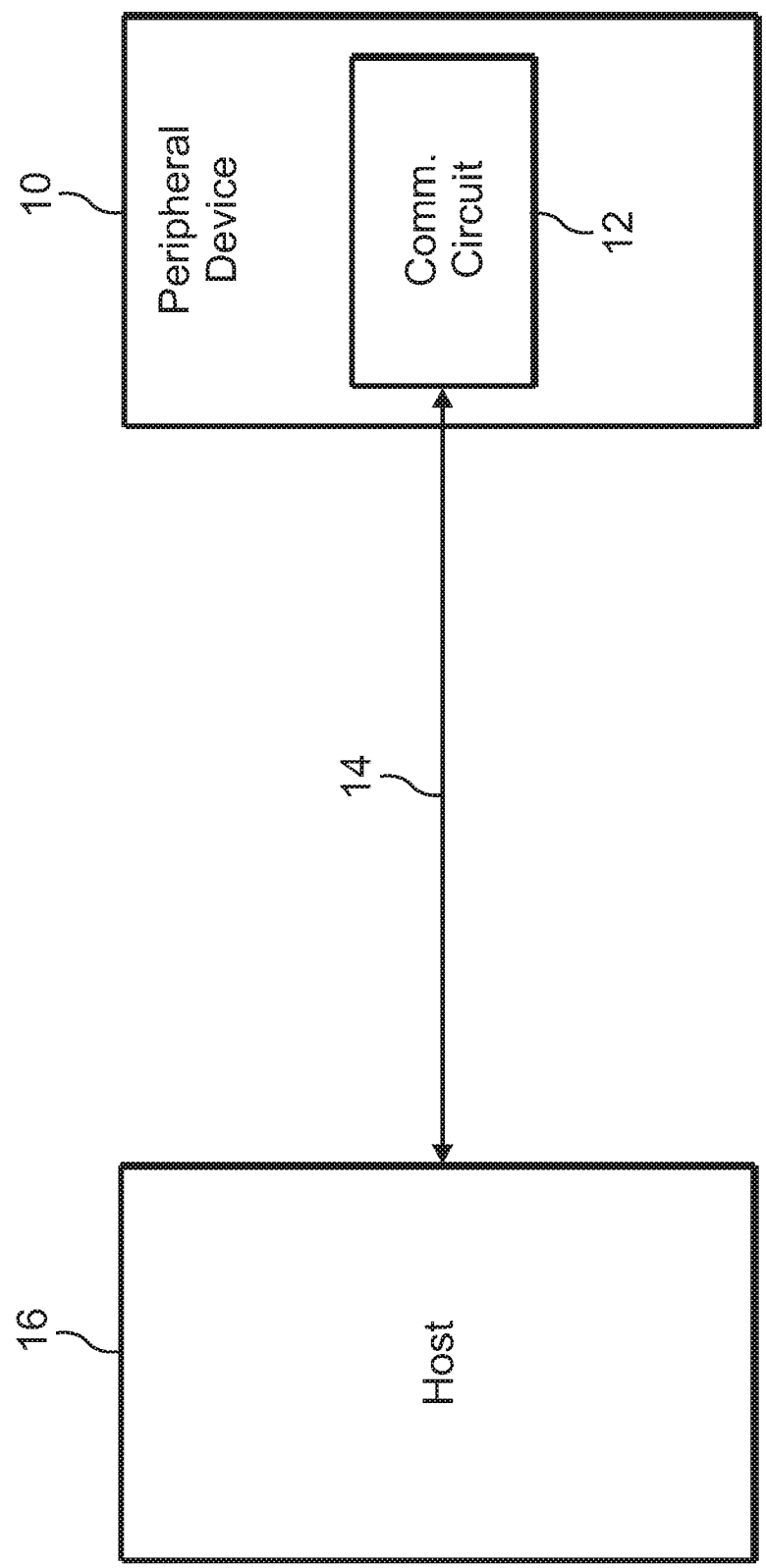
FIG. 1 illustrates a block diagram of a system whose power consumption may be reduced according to an exemplary embodiment.

The disclosed techniques for reducing power consumption may be used in a variety of apparatus or systems. FIG. 1 illustrates a system whose power consumption may be reduced according to an exemplary embodiment. The system in FIG. 1 includes a host 16 (or a source of information, generally) that communicates with a peripheral device 10 (or a destination for the information, generally) via communication link or bus 14.

Peripheral device 10 includes communication circuit 12, which couples to host 16 via link 14. Thus, communication circuit 12 provides a mechanism for host 16 and peripheral device 10 to communicate information. In some embodiments, communication circuit 12 may include a transceiver, which allows both the reception and transmission of information via link 14.

In exemplary embodiments, the information communication via communication link 14 may occur periodically. For example, in some embodiments, the information is communicated in bursts. As another example, in some embodiments, the information is communicated via packets.

Note that host 16 and peripheral device 10 may reside in the same physical package or enclosure, or they may reside in different physical packages or enclosures, communicating via link 14. Furthermore, note that either or both peripheral device 10 and host 16 may include a variety of subsystems or circuits, some of which facilitate communication of information via link 14. In particular, in the embodiment in FIG. 1, communication circuit 12 includes (not shown) circuitry for reducing power consumption of communication circuit 12 and, thus, of peripheral device 10.

Figure 2:
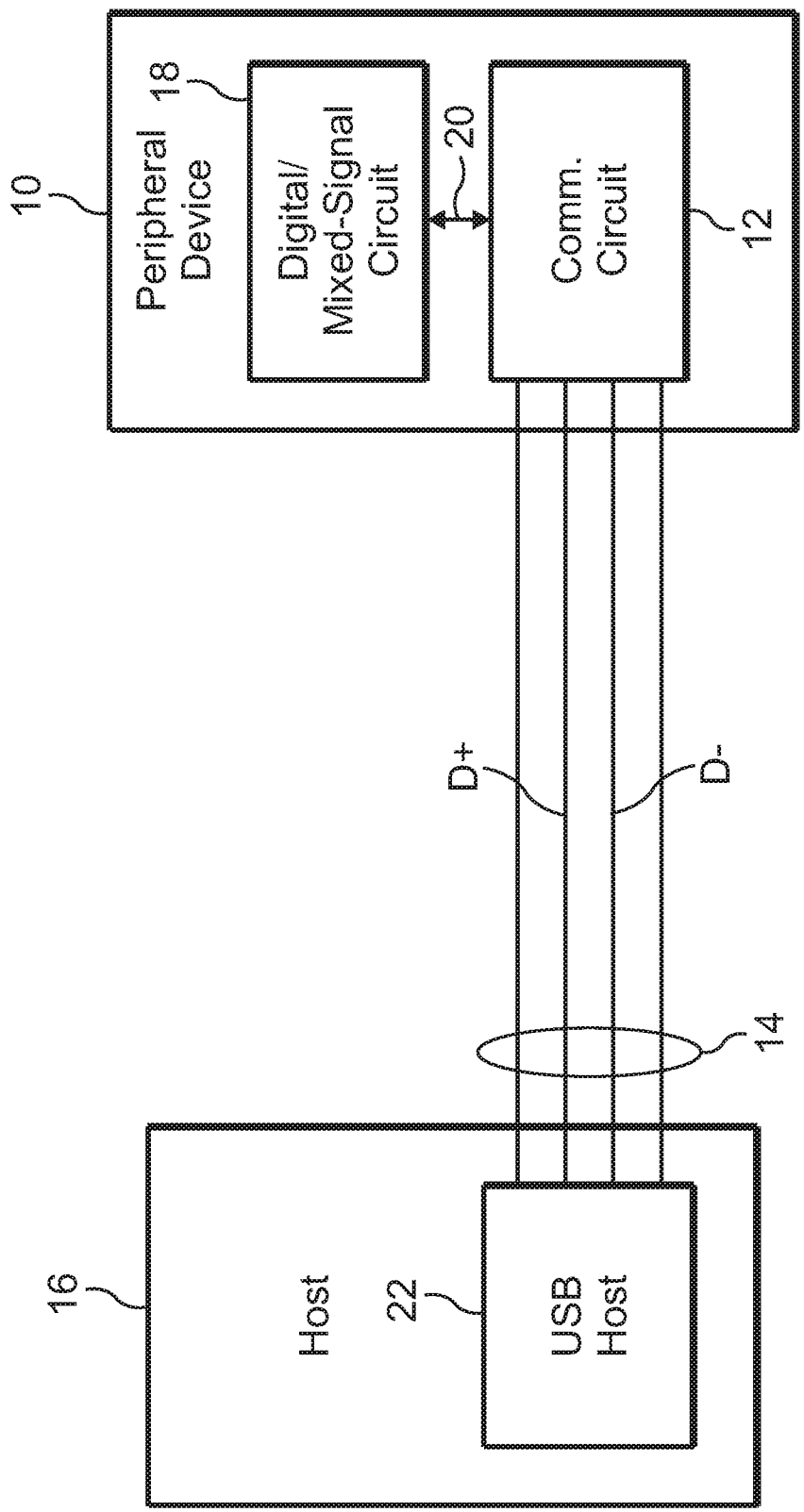
FIG. 2 depicts a block diagram of a system that communicates information using the USB protocol according to an exemplary embodiment.

In some embodiments, communication circuit 12 may be a USB device or include circuitry to provide USB communication with host 16. FIG. 2 depicts such a system according to an exemplary embodiment.

In the embodiment shown in FIG. 2, link 14 constitutes or includes a USB bus. Host 16 includes USB host 22, which communicates information to/from USB bus 14. As persons of ordinary skill in the art understand, USB bus 14 includes one conductor for power, and one conductor for ground or a reference voltage. USB bus 14 also includes two conductors for a differential signal, labeled in FIG. 2 as "D+" and "D−," respectively. The differential signal provides a means of communication between host 16 and peripheral device 10 according to USB protocols.

In peripheral device 10, communication circuit 12 can send and/or receive information according to USB protocols. In the embodiment shown, communication circuit 12 communicates with a digital/mixed-signal circuit 18 via link or bus 20. Through link or bus 20, communication circuit 12 may receive information from, or provide information to, digital/mixed-signal circuit 18.

In some embodiments, digital/mixed-signal circuit 18 may include digital circuitry, such as a processor, memory, etc. that interfaces with communication circuit 12. In some embodiments, digital/mixed-signal circuit 18 may include a microcontroller unit (MCU). Digital/mixed-signal circuit 18 (or the MCU) may include digital circuitry (e.g., memory, processing circuitry, arithmetic circuitry, logic circuitry, and the like).

Digital/mixed-signal circuit 18 (or the MCU) may further include analog or mixed-signal circuitry, such as analog-to-digital converters (ADCs), amplifiers, comparators, and the like. Note that in some embodiments, communication circuit 12 may be part of the MCU, for example, integrated on the same semiconductor die as the MCU, and/or included in the same package as the MCU (e.g., in a multi-chip module), as desired.

As described below in detail, one aspect of the disclosure concerns disabling an oscillator for communication circuit 12 during periods when the device is idle or waiting for incoming information, such as USB traffic, packets, etc., and re-enable the oscillator when incoming traffic or information is detected. Put another way, the oscillator is in a low-power state or disabled when the device is idle. The oscillator is in the normal or enabled mode of operation or state when incoming traffic, information, or packets are detected, e.g., the communication link is in a non-idle state.

In exemplary embodiments, an internal (to communication circuit 12 or to peripheral device 10) oscillator, such as a resistor-capacitor-based (RC-based) oscillator (not shown in FIGS. 1-2; described below in detail) is used. The oscillator may be disabled and enabled relatively quickly (compared, for example, to crystal-based oscillators). In other words, the oscillator can make transitions between the normal and low-power modes of operation or states relatively quickly.

As described below in detail, another aspect of the disclosure relates to disabling or placing in a low-power state parts of communication circuit 12 when waiting for communication to occur via link 14, for example, incoming USB packets or traffic (e.g., when the bus is idle). An example of circuitry that can be disabled or placed in a low-power mode or state is a receiver that receives communication, such as packets or bursts of information, from link 14. The receiver may be enabled or placed in a normal mode of operation or state when link 14 is in a non-idle state or when other events take place, as described below in detail.

Figure 3:
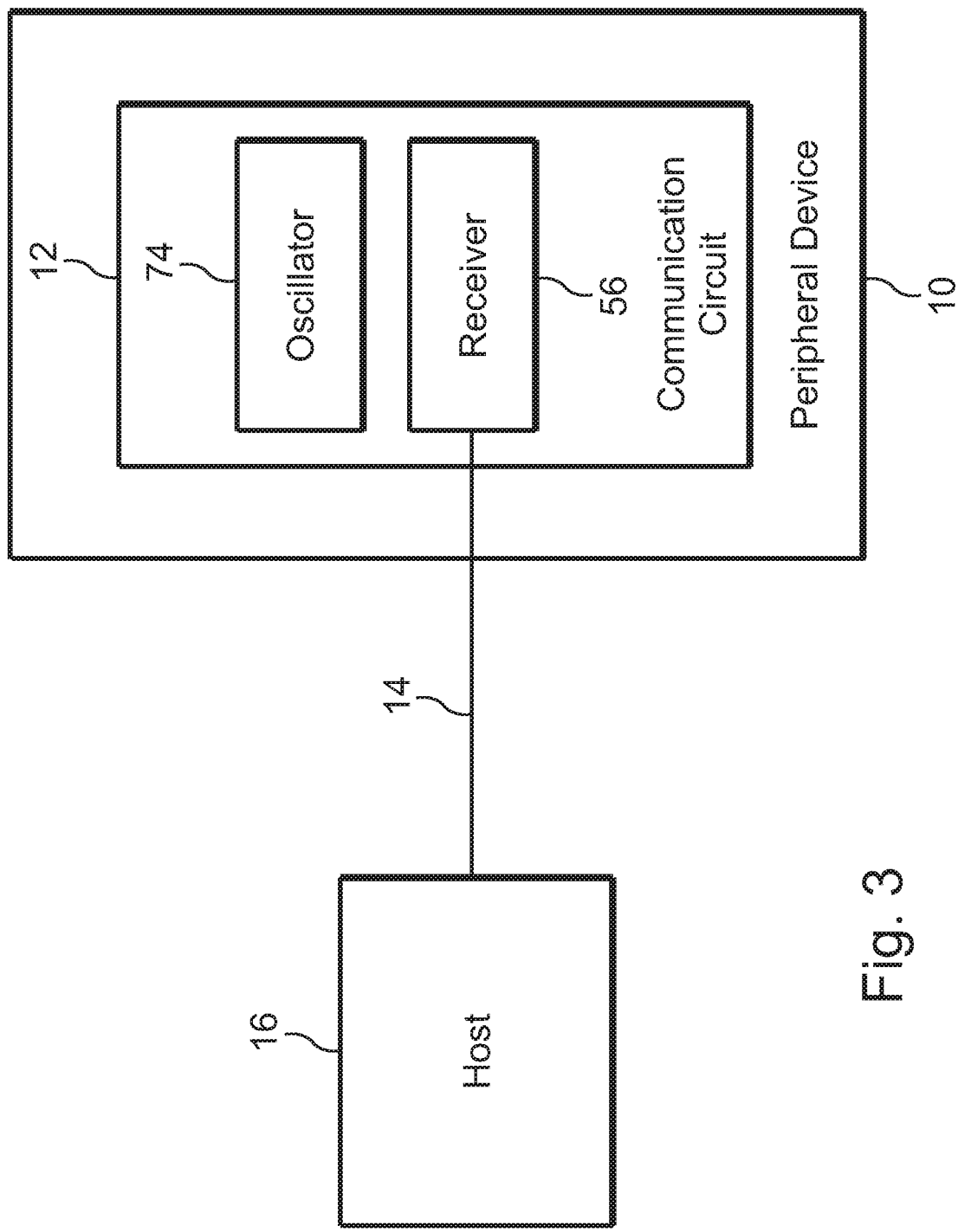
FIG. 3 shows a more detailed block diagram of a system whose power consumption may be reduced according to exemplary embodiments.

FIG. 3 shows a block diagram of another system whose power consumption may be reduced according to exemplary embodiments. Similar to FIGS. 1-2, the system in FIG. 3 includes host 16, which communicates with peripheral device 10 via link 14.

Also similar to FIGS. 1-2, communication circuit 12 couples to link 14 to receive information from link 14 and/or transmit information to link 14. Referring to FIG. 3, in the exemplary embodiment shown, communication circuit 12 includes oscillator 74. Oscillator 74 provides one or more timing signals, such as clock signal(s), to circuitry in communication circuit 12.

Oscillator 74, or parts of oscillator 74 (i.e., oscillator 74 may be partially or fully disabled), may be disabled or placed in a low-power mode of operation or state when peripheral device 10 or communication circuit 12 is idle or waiting for incoming information. Oscillator 74 is enabled or placed in a normal mode of operation or state when incoming traffic or information is detected. When oscillator 74 operates in the normal mode of operation or state (i.e., is enabled), it provides one or more timing signals to circuitry in communication circuit 12, as described above.

Similarly, receiver 56, or parts of receiver 56, may be disabled or placed in a low-power mode of operation or state (e.g., by inhibiting one or more of its bias currents) during certain periods of time, e.g., when peripheral device 10 or communication circuit 12 is idle or waiting for incoming information, during to-be-rejected packets, or during certain other conditions, such as a reset condition (in embodiments that communicate using USB signaling).

During other times, for example, when the above conditions do not exist or information exists that receiver 56 should receive (e.g., a valid packet in a USB signaling embodiment), receiver 56 may be enabled or placed in a normal mode of operation or state (e.g., by enabling its bias current(s)). Receiver 56 may thereafter receive information from link 14.

Referring to FIGS. 1-3, in some embodiments, all or part of the system may be battery powered, mobile, or portable. In some embodiments, all or part of the system may be powered by an alternative or renewable energy source, such as solar cells, or by a hybrid source, for example, a solar cell in combination with a battery. Given the relatively small amount of energy available in such applications, the apparatus and techniques for communication circuits with reduced power consumption provide advantages or benefits, for example, by extending the battery life, increasing the "up-time" (e.g., delaying the point in time when the system enters sleep, hibernation, or shutdown mode or state) or active time of the system, and the like.

Figure 4:
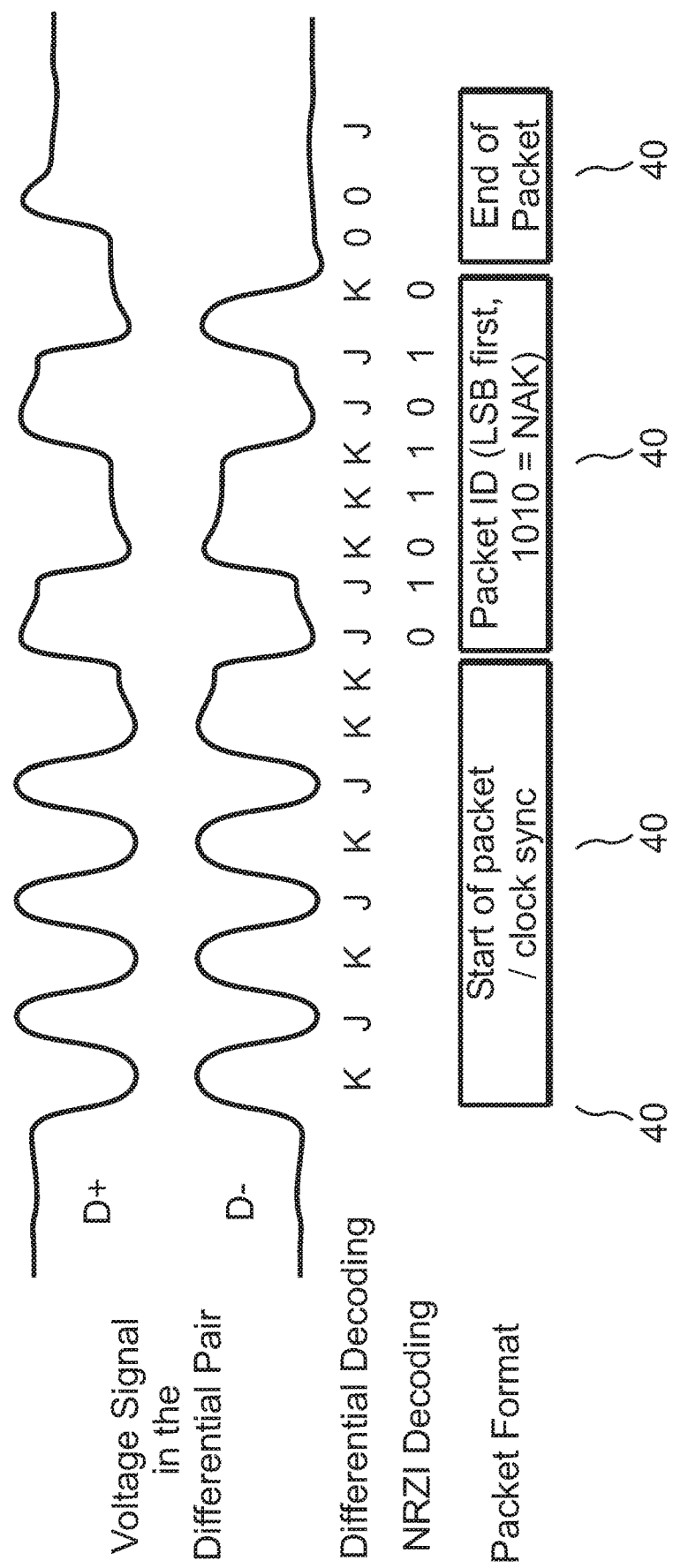
FIG. 4 depicts a diagram for USB communication in an exemplary embodiment.

As noted, in some embodiments, communication circuit 12 communicates with a USB bus (see, for example, FIGS. 2-3). Since USB packets start with a synchronization pattern, no data are lost as long as the oscillator is stable and the USB logic circuitry has aligned to the incoming bits of data before the end of this synchronization pattern. FIG. 4 shows a diagram of the start of a USB packet operating in full-speed mode (USB supports devices with various speed classes).

As FIG. 4 shows, the USB signals occupy two states, labeled as "J" and "K." When idle, the USB signals occupy the "J" state, e.g. signal D+ has a logic high value, and signal D− has a logic low value when in the full-speed mode. At the start of a packet, the synchronization pattern starts, causing the USB signals to leave the idle state. The "KJKJKJKK" sequence illustrated in FIG. 4 is the synchronization pattern for full-speed operation. Other details of operation of USB are known to persons of ordinary skill in the art, and are therefore not described here.

The synchronization pattern is followed by the packet payload, in this case including a packet identification (ID) indicating that the packet is a "NAK" packet. The synchronization pattern is used by the receiving USB controller (included in peripheral device 10, and described below in detail) to align its sampling of the incoming D+ and D- signals with the center of the received bits.

In FIG. 4, the ideal or preferred sample time is approximately the mid-point between the vertical lines labeled as "40." Since the synchronization pattern has no other purpose, the receiving USB controller need not correctly sample the start of the synchronization pattern, as long as by the end of the pattern the controller has successfully aligned its sampling time to avoid bit errors.

To do so, the local clock used by the receiving USB controller should be stable by approximately the half-way point or mid-point of the incoming synchronization pattern, thus allowing the controller to use the second half of the synchronization pattern to align its sample time.

A number of known methods for aligning the sample time with the synchronization pattern may be used. A person of ordinary skill in the art would understand, it may be desirable for the local clock may in some circumstances to be stable sooner or later than the approximate mid-point of the synchronization pattern, depending on the alignment method used.

Taking advantage of the property and sequence of events described above with respect to the synchronization pattern and sampling time, the oscillator that generates the local clock when the bus is idle may be disabled (fully or partially) for a period of time. The oscillator may then be enabled or re-enabled when the first "K" state of the synchronization pattern is detected. In general, the oscillator may remain enabled until the data or information packet has been received, processed, and any appropriate or desired response has been transmitted back to the source of the transmission, e.g., host 16.

In some embodiments, the oscillator is entirely disabled, e.g. its power consumption is reduced to substantially zero (neglecting leakage currents). In some embodiments, the oscillator may be partially disabled. For example, the oscillation may be halted but oscillator analog bias circuits may remain enabled to provide faster startup.

In some embodiments, the oscillator may remain fully enabled, but the oscillator output signal (e.g., clock) may be digitally gated to a logic high or a logic low state. Doing so reduces the power consumed by the USB logic circuitry that uses the clock signal, as power consumption in typical circuits (e.g., circuits using complementary metal oxide semiconductor, or CMOS devices) depends on the frequency of operation of such circuits.

By gating the oscillator output, such embodiments provide compatibility with high-quality factor (high-Q) oscillators, such as crystal oscillators (with relatively slow startup times), or with phase-locked-loop-based oscillators. In some embodiments, the oscillator output may be digitally gated as it is provided to one or more circuits, but be left operational (e.g., not gated) as it is provided to one or more other circuits. In other words, some circuits may stop receiving an active clock while other circuits continue to receive an active clock. This technique may be advantageous in embodiments in which it is desirable that some circuits receive a continuously running clock signal independent of the state of the communication bus.

Figure 5:
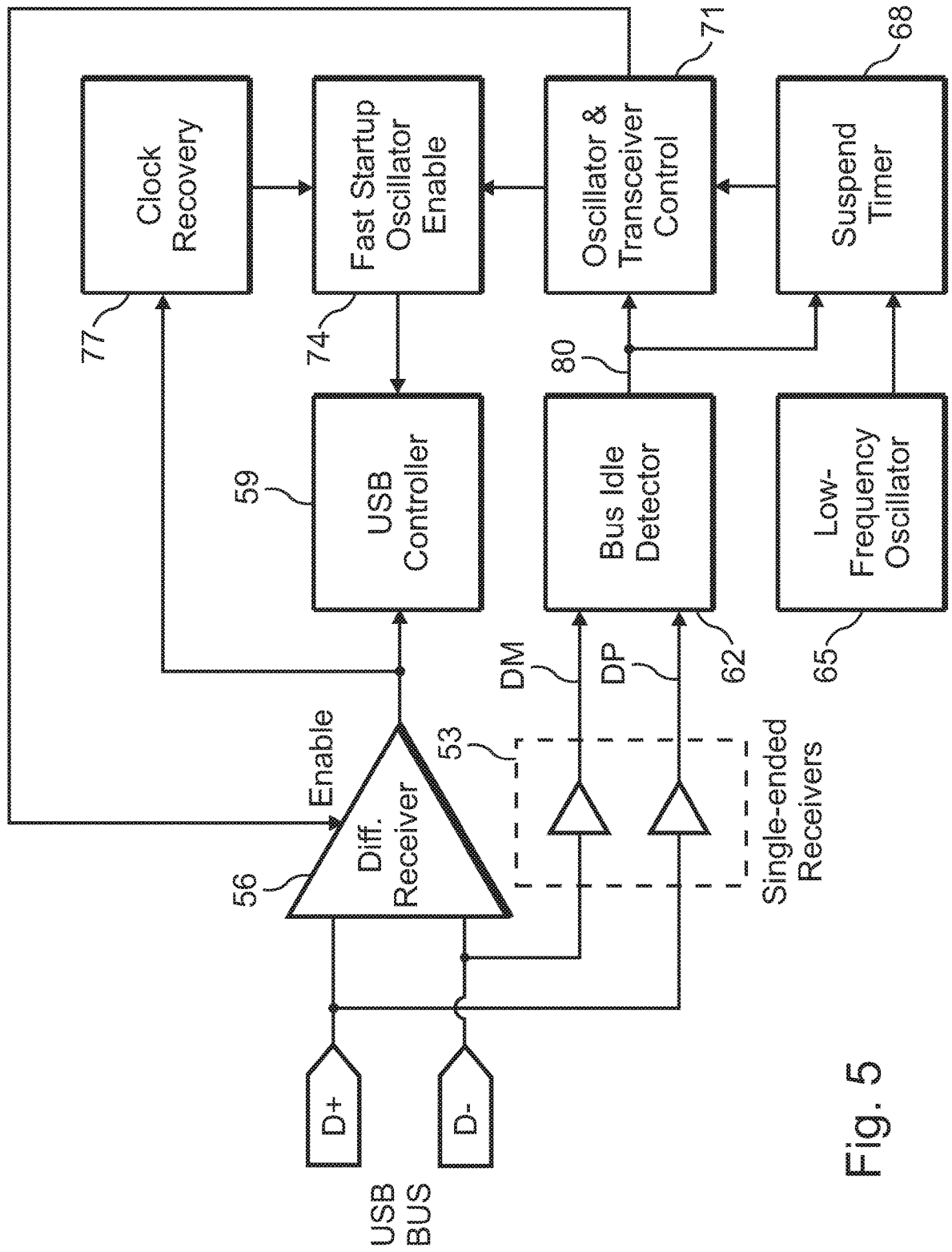
FIG. 5 illustrates a block diagram of a circuit arrangement for USB communication according to an exemplary embodiment.

FIG. 5 illustrates a block diagram of a circuit arrangement for USB communication according to an exemplary embodiment. A differential receiver (labeled "Diff. Receiver") 56 senses the differential state of the D+ and D− signals and generates a corresponding logic 1 or 0 (or logic high or low, respectively), which it provides to USB controller 59. The output of differential receiver 56 is generally sampled and processed by USB controller 59 to determine the received bits of the packet payload.

There are times during USB operation, however, when the transmitting device (e.g., a host, such as host 16 in FIGS. 1-3) pulls both the D+ and D− signals to a logic low level. For example, a USB host signals a reset condition by pulling both the D+ and D-signals to a logic low level. As a further example, a USB transmitter indicates the end of a packet by pulling both the D+ and D− signals to a logic low level, as illustrated in FIG. 4.

Since differential receiver 56 might not reliability indicate when both signals are at logic low levels (since the signals would be nearly equal, the output of differential receiver 56 might be indeterminate), the USB transceiver in FIG. 5 also includes a pair of single-ended receivers 53. Single-ended receivers 53 are used to detect such bus conditions, as described above.

In exemplary embodiments, single-ended receivers 53 can be used to detect the state of the USB signals, using logic circuitry in the bus idle detector circuit 62 in FIG. 5. For example, the following Verilog statement can be used to detect an idle state on the bus:

IDLE=SPEED?(*DP&!DM*):(*!DP&DM*);

where SPEED is at a logic high level for full-speed operation, and at a logic low level for low-speed operation and DP and DM are the outputs of the D+ and D− single-ended receivers 53, respectively.

In some embodiments, a single-ended receiver may be used to detect an idle state of the bus. For example, since the state where both D+ and D− are at a logic high level for a significant period of time is invalid for a USB interface, a single-ended receiver 53 detecting the state of the D+ signal may be adequate to detect an idle condition on a full-speed USB interface (by detecting when D+ is a logic high). Similarly, for a low-speed USB interface, a single-ended receiver 53 detecting when D− is a logic high may be adequate to detect an idle condition. In some embodiments, a multiplexer may be used to selectively couple a single-ended receiver to either the D+ or D− signal, depending on whether the USB controller is operating in full-speed mode or in low-speed mode.

Using single-ended receivers 53 instead of using differential receiver 56 provides the advantage that oscillator 74 should generally be re-enabled by a USB reset signal. As discussed above, a USB reset signal might not be reliably detected by differential receiver 56.

Note, however, that in some embodiments, an alternative circuit arrangement may be used to detect the bus state, including a circuit dedicated to that purpose. For example, the logic generated by the Verilog statement above may be used to directly detect the bus state as long as the logic thresholds of the digital gates used for such detection are appropriate for the USB signaling levels.

Referring to FIG. 5, bus idle detector circuit 62 uses the outputs of single-ended receivers 53 to determine the state of the USB signals D+ and D−. When the bus state leaves the idle state (the bus is in a non-idle state), as illustrated in FIG. 4, bus idle detector circuit 62 uses output signal 80 to assert the enable control to oscillator 74 via oscillator and transceiver control circuit 71.

Oscillator 74 has relatively fast start-up times (compared, for example, to crystal oscillators). Oscillator 74 generates the clock signal used by logic circuits in USB controller 59 to process the incoming USB traffic. When USB controller 59 indicates that the incoming packet has been received, and optionally processed and/or responded to, oscillator and transceiver control circuit 71 can automatically de-assert the enable to oscillator 74.

In some embodiments, the condition under which oscillator 74 may be disabled by de-asserting its enable input may be detected by a circuit outside of USB controller 59. For example, a circuit that detects that the USB bus has been in an idle state for at least a minimum amount of time may trigger de-assertion of the enable signal provided to oscillator 74. As noted above, the USB bus generally occupies the J state when idle. According to the USB protocol, the USB bus should not remain in this J state for longer than about 6 bit periods, except when idle. A method commonly called bit-stuffing is specified by the USB protocol to prevent a long period of J (or K) signaling during packet transmission. This method allows a circuit to detect a true idle state of the bus by detecting when the bus has been in the J state for more than about 6 bit periods. In some embodiments, this circuit may use the outputs of single-ended receivers 53 to detect the idle, or J, state.

In exemplary embodiments, the de-assertion of the oscillator enable can occur immediately or after a programmable period during which the USB signals D+ and D-remain idle. For example, oscillator 74 can automatically be disabled anytime the USB signals remain idle beyond a programmed period of time, as measured, for example, by counting oscillator cycles.

In other embodiments, the oscillator may be disabled after transmission or detection of an EOP condition (described below). In some embodiments, the task of placing the oscillator back in its disabled state can be left to firmware running on a processor or other device, such as the MCU discussed above. For example, after the firmware has performed any processing necessary on a received packet, the firmware might set or clear a register bit (not shown) that disables oscillator 74.

Oscillator 74 can also be forced to remain enabled due to other system events. For example, a register bit (not shown) can be provided, which when set or cleared by firmware running in a processor or MCU, can force the oscillator to remain enabled independent of the state of the USB signals. Similarly, any pending interrupt from USB controller 59 to a processor or MCU can force oscillator 74 to remain enabled. This may be done to allow USB controller 59 to remain available to the processor or MCU for access of registers, payload first-in-first-out (FIFO) buffers, etc.

As specified by the USB specifications, a USB device should enter a suspend state when the bus remains in its idle state for at least 3 milliseconds. This arrangement allows a host to suspend a device by halting all traffic to that device (otherwise, the host is expected to send at least a Start-of-Frame packet every millisecond to a full-speed USB device).

In conventional USB interfaces, the 3-millisecond period is generally measured by counting cycles of the USB oscillator. In exemplary embodiments, however, oscillator 74 may be disabled when the bus is idle, as described above. In that situation, oscillator 74 would be unavailable for detecting the 3-millisecond period. To detect the 3-millisecond idle period, several alternatives may be used.

In some embodiments, a suspend timer circuit 68 is used. Suspend timer circuit may be clocked from an alternative, low-frequency (e.g., 32 kHz) clock source (not shown). The clock source is used to clock suspend timer circuit 68 to measure the length of idle periods on the bus (e.g., the timer automatically returns to 0 when the bus is non-idle, and increments when the bus is not in the idle state). When suspend timer circuit 68 reaches a value indicating approximately 3 milliseconds, oscillator 74 is re-enabled to allow USB controller 59 to process the suspend request.

The USB specification include a specified timing accuracy when transmitting packets onto the bus. For full-speed USB operation, the rate at which a device transmits bits is 12 megabits-per-second (MBPS), with an error of no more than plus or minus 0.25%. In typical USB controllers, this accuracy is achieved by the USB oscillator having the requisite accuracy. In some embodiments, this oscillator accuracy may be achieved by a crystal oscillator (or an internal oscillator frequency locked to a crystal-derived clock signal). In other embodiments, the accuracy may be achieved by incorporating a clock recovery circuit 77 that adjusts the frequency of an internal RC oscillator.

As noted above, U.S. Pat. No. 6,917,658 discloses a clock recovery method that allows a USB device to operate using an internal oscillator rather than a crystal oscillator (or an internal oscillator frequency locked to a crystal clock). Depending on the method chosen to provide the requisite accuracy, in some embodiments, oscillator 74 may be kept enabled when the bus is idle, but the oscillator output clock to USB controller 59 may be digitally gated, as described above. For example, in the case of the clock recovery method disclosed in U.S. Pat. No. 6,917,658, the oscillator may remain enabled to provide a continuous clock to clock recovery circuit 77.

Figure 6:
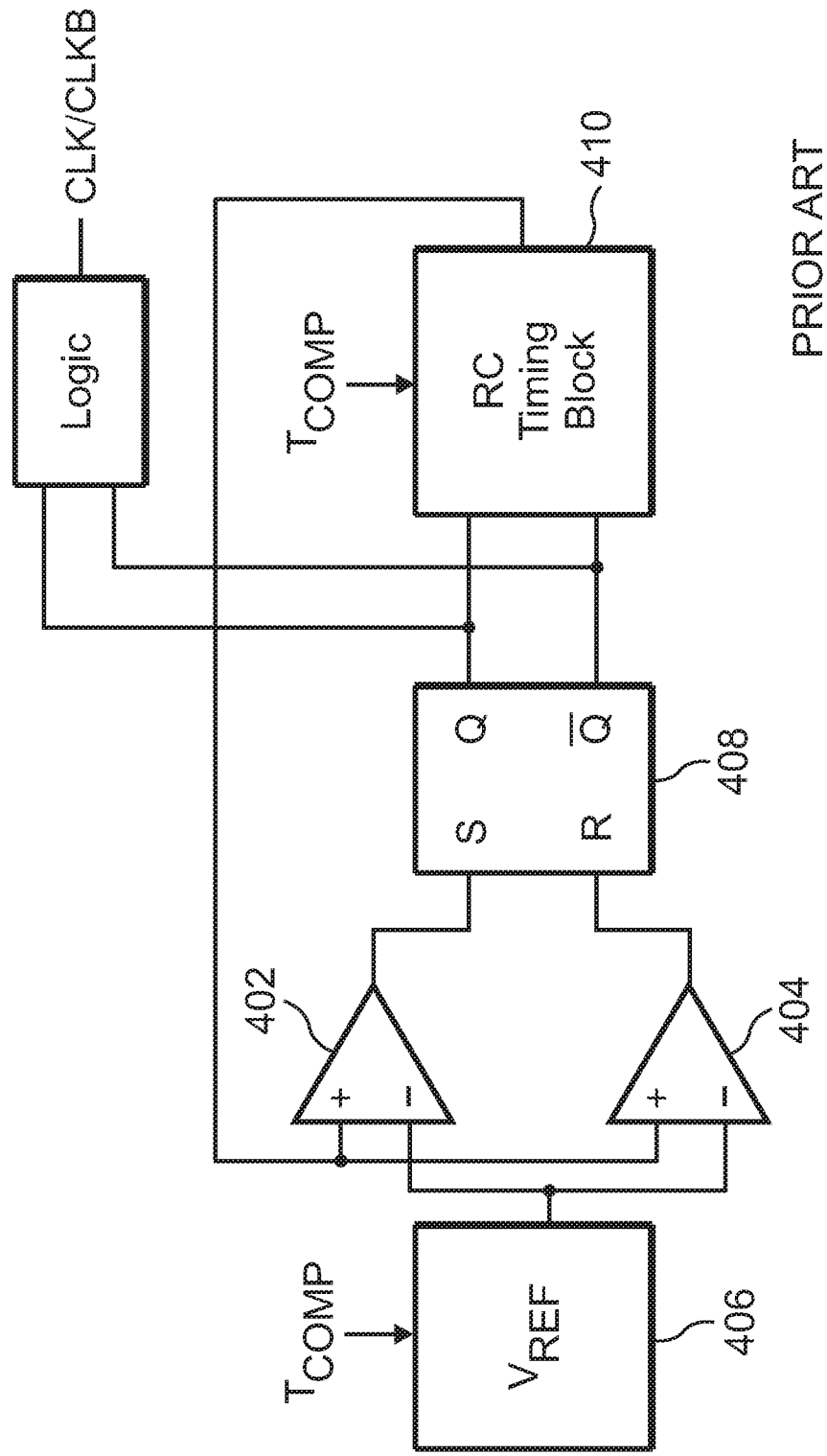
FIG. 6 depicts an exemplary conventional circuit arrangement for implementing oscillator 74.
Figure 7:
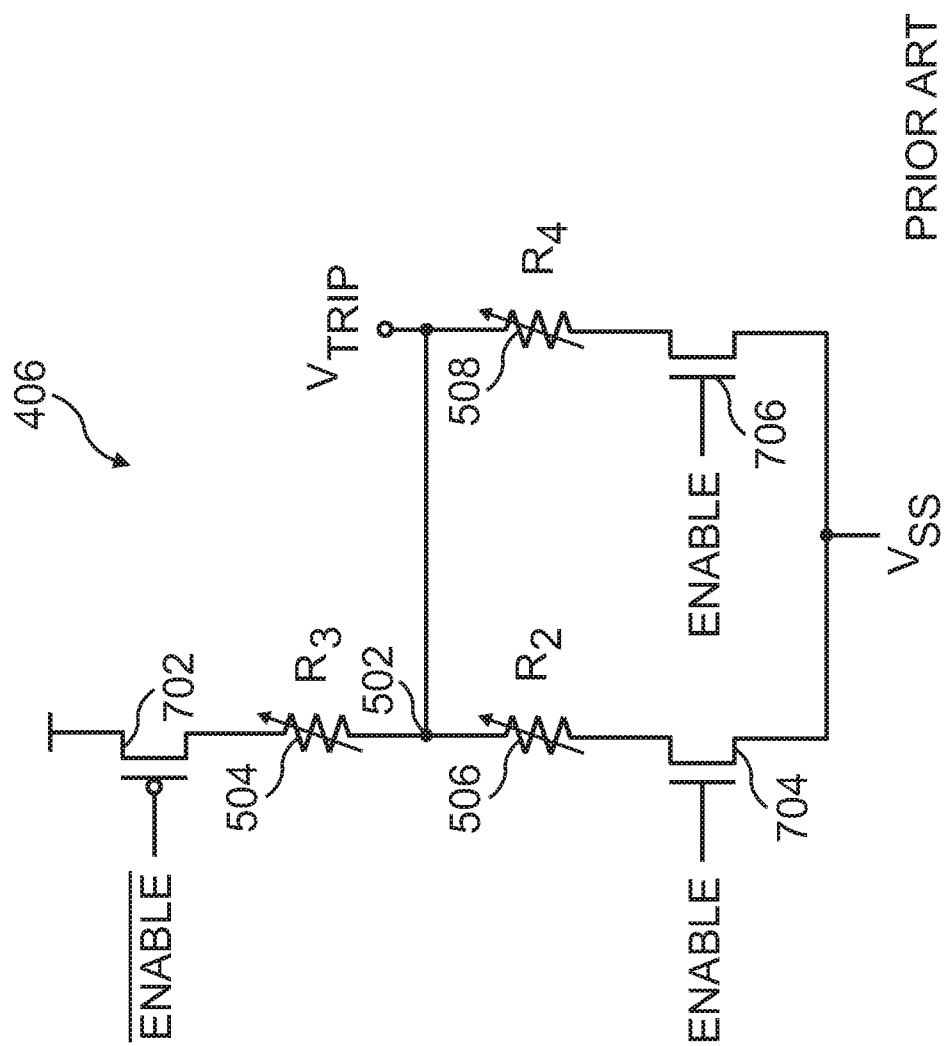
FIG. 7 illustrates a conventional circuit arrangement for disabling oscillator 74.

Oscillator 74 may be implemented in a variety of ways. As merely one example, the circuitry described in U.S. Pat. No. 7,395,447 might be used to implement oscillator 74 in exemplary embodiments. FIG. 6 depicts an exemplary circuit arrangement for implementing oscillator 74. In the oscillator shown in FIG. 6, $V_{REF}$ (406) and comparators (402 and 404) generally consume static power, whereas latch (408) and RC Timing Block (410) generally do not consume static power. In exemplary embodiments, it is beneficial to disable the oscillator components that consume static power. For example, $V_{REF}$ block (406) can be disabled as shown in FIG. 7 (described in U.S. Pat. No. 7,395,447).

Referring to the $V_{REF}$ block in FIG. 7, the enable control signal (ENABLE) from oscillator and transceiver control circuit 71 (see FIG. 5) activates the current paths though the resistor divider used to generate the VTRIP voltage. When the ENABLE signal has a logic low value, $V_{REF}$ block 406 is disabled, such that it consumes no (or little) static power. In some embodiments, however, it might be advantageous to leave $V_{REF}$ block 406 enabled during idle periods to provide for faster startup of oscillator 74 when an incoming USB packet is detected.

Figure 8:
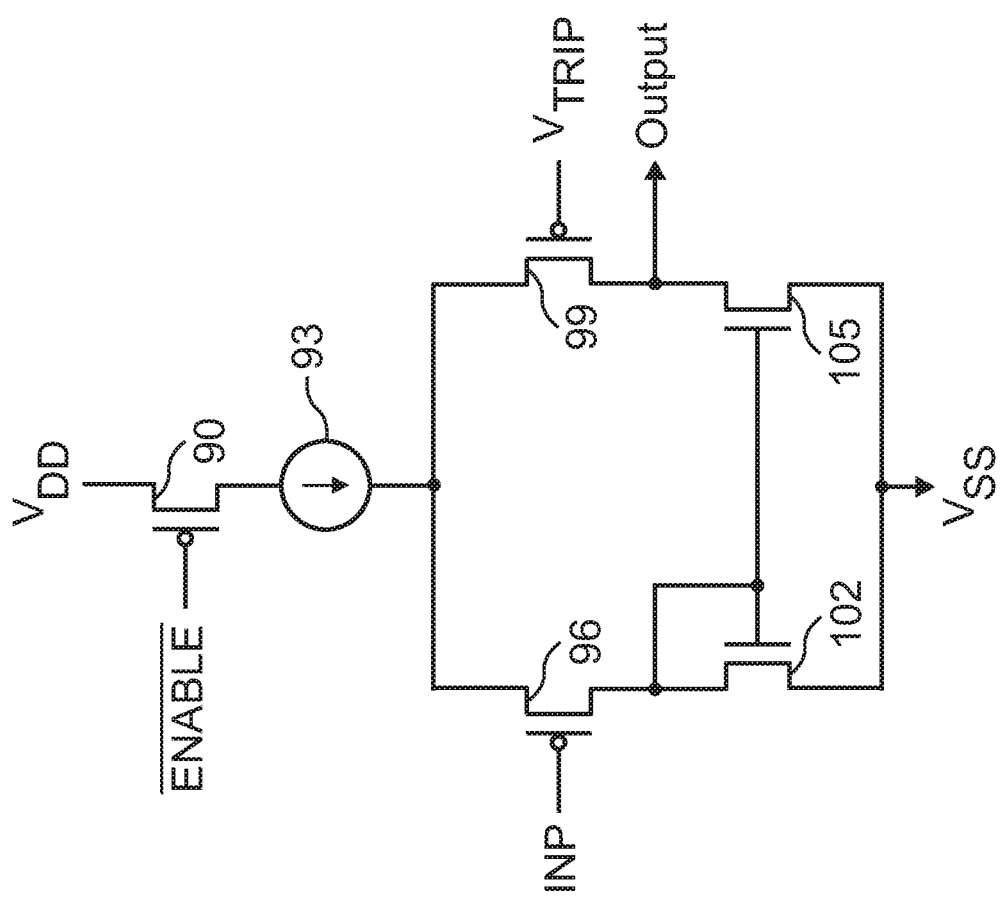
FIG. 8 shows a circuit arrangement for implementing a comparator for use in exemplary embodiments.

FIG. 6 depicts two comparators, 402 and 402, as part of the oscillator circuit. FIG. 8 shows a circuit arrangement for implementing the comparators in exemplary embodiments. The comparator receives its inputs via transistors 96 and 99. Transistors 102 and 105 constitute a current mirror. Current source 93 provides a bias current to transistors 96 and 99.

The complement of the enable signal for oscillator 74 (not shown) drives the gate of transistor 90. When the enable signal is in a logic high state (and its complement is therefore in a logic low state), transistor 90 turns on, and enables the comparator. Conversely, when the enable signal is in a logic low state (and its complement is therefore in a logic high state), transistor 90 turns off. In this scenario, the path from the supply voltage $V_{DD}$ to current source 93 is interrupted, which disables the comparator.

Note that the circuits shown in FIGS. 6-8 provide merely examples of implementing oscillator 74 and its associated components/circuits. A variety of alternatives exist for implementing oscillator 74 and its associated components/circuits, as noted above.

Another aspect of the disclosure relates to reducing power consumption of communication circuitry, such as USB devices or transceivers. This technique disables power-consuming parts of such circuitry (e.g., parts that consume relatively high amounts of power) when waiting for communication, for example, incoming USB packets or traffic (e.g., when the bus is idle).

For example, differential receiver 56 (see FIG. 5) generally consumes static power, for example, power consumption that is independent or nearly independent of what or whether traffic exists on the bus (static power consumption helps achieve the desired performance). However, in exemplary embodiments, single-ended receivers 53 are generally CMOS buffers, whose power consumption is effectively zero when the bus is idle.

Much like oscillator 74, differential receiver 56 is used during the second half of the synchronization pattern (to assist in sample alignment), and during reception of the packet payload and overhead traffic, such as cyclic redundancy check (CRC) fields, etc. As with oscillator 74, differential receiver 56 can be disabled during idle periods on the bus, and automatically re-enabled when the start of the synchronization pattern is detected.

As long as differential receiver 56 is operational by about the mid-point of the synchronization pattern, the incoming packet can be successfully received. In some embodiments, differential receiver 56 is enabled and disabled at the same approximate time instances as oscillator 74. In other embodiments, differential receiver 56 may be enabled and disabled at times different than when oscillator 74 is enabled and disabled.

In some embodiments, the outputs of single-ended receivers 53 may be used to achieve alignment with the synchronization pattern, allowing differential receiver 56 to remain disabled until near the end of the synchronization pattern. A comparator architecture similar to that shown in FIG. 8 can be used to disable differential receiver 56. Register configuration bits, discussed above, can also be provided to force the USB interface to keep the transceiver components and/or the oscillator components (see FIG. 5) enabled during idle periods.

In exemplary embodiments, power consumption of communication circuit 12 (e.g., a USB) is reduced by inhibiting the clock (e.g., USB clock) and/or parts of communication circuit 12, such as the USB differential transceiver, during incoming packets which will be rejected by the device. For example, in the case of USB devices, in some applications, the transmitting device (e.g., host 16) can provide data to the receiving device faster than the receiving device can process those data.

In a particular example, one USB application might transmit data from a host computer or device that will be transmitted across a universal asynchronous receiver transmitter (UART) bus by the receiving device. Since a USB bus can generally operate at a much higher bit-rate than a UART, incoming packets of data may be received faster than can be transmitted across the UART.

In such a case, the receiving device will generally reject incoming packets until room is made available in the device's packet first-in, first-out (FIFO) buffer by moving the data from a previous accepted packet in preparation for transmission using the UART. The device rejects the incoming packet by responding with a NAK packet transmitted back to the host. Depending on the relative bit rates of the USB and the UART, a relatively large fraction of the total device power consumption may be wasted in receiving data what will be rejected by the device, particularly since the USB host generally transmits the entire packet, including its data payload, before a NAK is returned by the device.

According to an aspect of the disclosed concepts, the clock signal(s) and/or differential transceiver of the receiving device, such as a USB device, are disabled during reception of some portion of to-be-rejected packets. The particular case of USB provides an example of this technique.

Each USB packet includes a SYNC field, a Packet ID (PID), an optional data payload with its CRC field, and an EOP condition. A receiving USB device generally decides that a packet will be rejected after receiving the PID, i.e. before the data payload arrives. This decision generally depends on whether the receiving device has sufficient space in its buffers to store the incoming packet at the time the PID is received.

In exemplary embodiments, the receiving device, e.g., communication circuit 12, can disable its clock signal(s) and/or transceiver circuitry shortly after receiving the PID of a rejected packet. Since the SYNC and PID occupy 16 bits compared to a much larger potential payload, this feature allows the receiving device to remain in a relatively low-power state for a majority of duration of the rejected-packet transmission.

Once the device decides to reject an incoming packet, it disables the USB clock and/or differential transceiver (e.g., differential receiver 56), as described above. However, unlike the features described above, where oscillator 74 is re-enabled by non-idle USB traffic, in some embodiments, the clock signal(s) and/or transceiver circuitry remain disabled until the end of the incoming rejected packet is detected.

One technique for detecting the end of the packet is to detect the USB EOP condition on the bus. As illustrated in FIG. 4, an EOP consists of an approximate two-bit period during which both the D+ and D− signals are pulled to a logic low state. Detection of the EOP causes the USB device to re-enable its clock signal(s) and/or differential transceiver (e.g., differential receiver 56) in order to transmit the NAK packet back to the host. Once the NAK packet is transmitted, the bus will generally be idle and the device may also enter its low-power state, as described above relating to idle periods on the bus.

When in its low-power state during incoming rejected packets, oscillator 74 and/or differential receiver 56 may also leave its low-power state if an unexpected state is detected on the bus. For example, if the EOP is lost due to communication errors, the device could otherwise fail to leave its low power state in time to transmit the NAK packet to the host.

To avoid such problems, the receiving device may also leave its low-power state when detecting, for example, a reset condition on the bus, or an idle bus period longer than a pre-determined period of time. For example, as discussed above, the receiving device may leave its low-power state if the J state is detected on the bus for more than approximately 6 bit periods, indicating a true bus idle state as opposed to a shorter duration of the J state that can occur during a normal packet transmission.

A reset condition also consists of a long period during which both the D+ and D− signals are pulled to a logic low state. Thus, in exemplary embodiments, the same circuit that detects an EOP can also be made to detect a reset condition.

Similarly, the same idle-detection methods described above (e.g., bus idle detector circuit 62) can be used to detect an idle period greater than, for example, 7 bit times. Since the USB clock is possibly disabled, this period can be qualified using an alternative clock source or an analog circuit for generating a discrimination pulse of the appropriate length of time. In some embodiments, this 7-bit idle period can be used to exit the low-power state, rather than using EOP detection.

Figure 9:
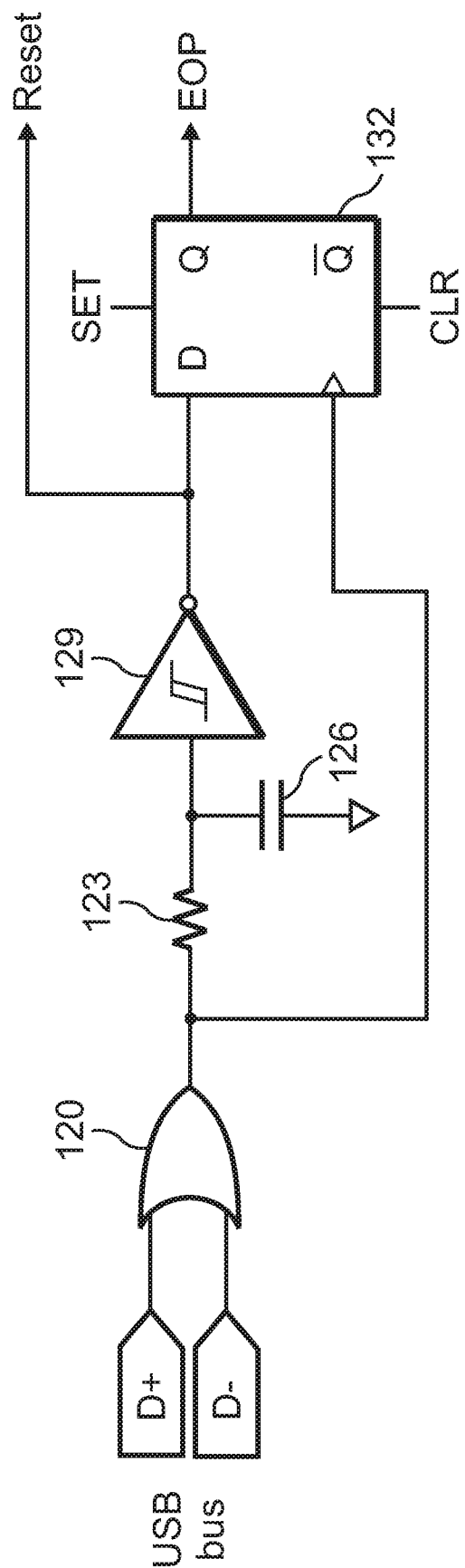
FIG. 9 illustrates a circuit arrangement for detecting an End-of-Packet (EOP) or reset condition according to an exemplary embodiment.

FIG. 9 illustrates a circuit arrangement for detecting an End-of-Packet (EOP) or reset condition according to an exemplary embodiment. When both the D+ and D-signals are driven to logic low levels, the output of OR gate 120 has a logic low value. Resistor 123 and capacitor 126 act as an RC combination or filter. After a period of time defined by the RC combination, the input to the Schmitt inverter 129 goes to a logic low state, and its output goes to a logic high state.

At the end of the EOP period, D+ and/or D− go to a logic high state, causing the output of OR gate 120 to return to a logic high state. The transition at the output of OR gate 120 causes the clocking the output of the Schmitt inverter 129 into D flip-flop 132, indicating the end of a detected EOP. For detection of a reset condition, the output of the Schmitt inverter 129 can be used directly.

The RC combination or filter allows rejection of short periods during which D+ and D− appear at a logic low state, such as during a transition from a state D+=logic high, D−=logic low to a state where D+=logic low and D−=logic high. The value of the RC time constant may be set or designed depending on the bit times. For example, an RC time constant of approximately one-half of a bit time can reject such glitches, which might otherwise be erroneously interpreted as an EOP event.

Another aspect of the disclosure relates to low-power communication apparatus or circuitry with wakeup detection and related and associated methods. Use of wakeup detection allows reducing the power consumption or power dissipation of the communication circuitry. Wakeup detection may be used in addition to the power saving techniques and apparatus described above.

Generally speaking, to apply wakeup detection, parts of communication circuit 12 (or all, depending on the particular architecture of communication circuit 12), such as USB communication circuitry, are placed in a low-power or powered-down state. By doing so, the power consumption of the communication circuitry and, thus, the overall power consumption of the apparatus or device or system in which the communication circuitry resides, is reduced.

Figure 10:
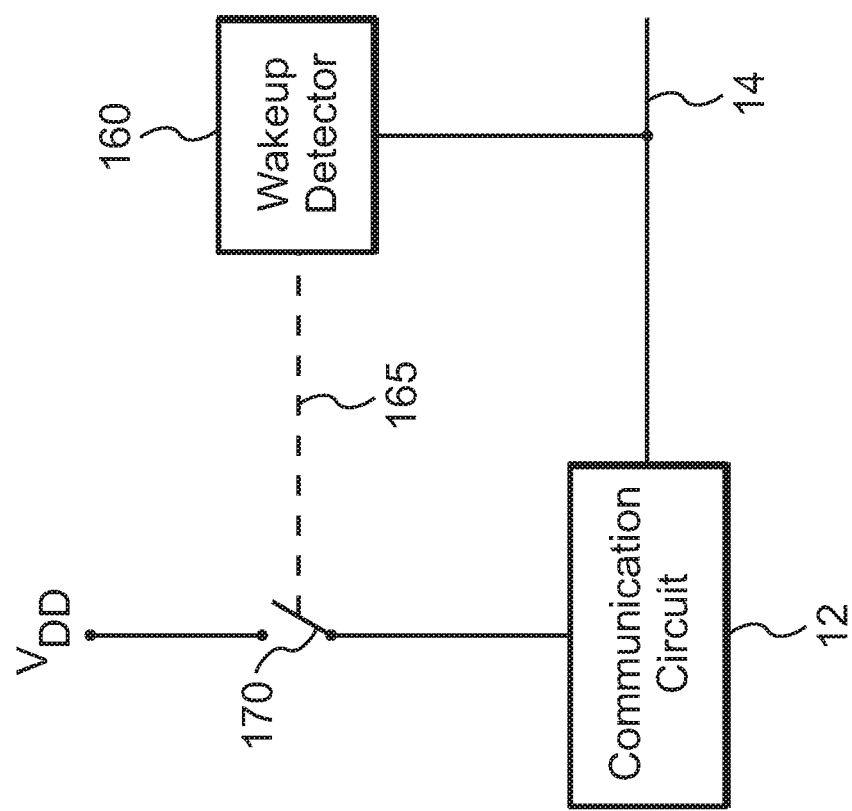
FIG. 10 depicts a circuit arrangement for information communication using a wakeup detector according to an exemplary embodiment.

FIG. 10 illustrates a circuit arrangement for information communication using a wakeup detector according to an exemplary embodiment. The circuit arrangement in FIG. 10 includes communication circuit 12. Communication circuit 12 has generally two modes or states: a normal mode of operation, and a low-power or powered-down mode or state.

During the normal mode of operation, communication circuit 12 provides communication with other circuits, devices, subsystems, systems, blocks, and the like. During the low-power or powered-down mode of operation, however, parts (or all) of communication circuit 12 are powered down or placed in a low-power condition. During this mode, communication circuit 12 consumes or dissipates less power than it does during the normal mode of operation.

Referring to FIG. 10, communication circuit 12 is coupled via communication link or bus 14 to wakeup detector 160.

The circuit arrangement further includes switch or device 170, coupled to provide supply voltage ($V_{DD}$) to communication circuit 12.

As noted above, communication circuit 12 can have or be in or assume the normal mode of operation or the low-power or powered-down mode. In some embodiments, when the circuit arrangement in FIG. 10 is first powered or initialized or reset, wakeup detector 160 may place communication circuit 12 in the low-power or powered-down mode.

Regardless of how communication circuit 12 is placed in the low-power or powered-down mode (i.e., whether at initialization or at some other point in time), during the low-power or powered-down state, wakeup detector 160 detects whether an event has occurred that should be processed by communication circuit 12. In other words, wakeup detector 160 waits for an event that should be processed by communication circuit 12, for example, receiving information via communication link or bus 14.

In exemplary embodiments, wakeup detector 160 may examine the state of communication link or bus 14 to detect a situation or event that warrants or potentially warrants waking up or resuming the operation of communication circuit 12. When wakeup detector 160 detects such a situation or event, it wakes up communication circuit 12, e.g., by closing switch 170 in order to supply power to communication circuit 12.

In the embodiment shown, wakeup detector 160 may control the state of switch 170 via a signal line 165, for instance by using one or more wakeup signals. For example, to turn on switch 170, wakeup detector 160 may assert a logic high signal (depending on the type of switch 170) on signal line 165. Conversely, to turn off switch 170, wakeup detector 160 may assert a logic low signal (depending on the type of switch 170) on signal line 165.

In response to closure of switch 170, communication circuit 12 wakes up, or leaves the low-power or powered-down state, and resumes or enters the normal mode of operation. Once it resumes the normal mode of operation, communication circuit 12 may examine communication link or bus 14 to ascertain the nature and/or details of the event that caused wakeup detector 160 to wake up communication circuit 12. Communication circuit 12 can then take appropriate actions.

For example, communication circuit 12 may determine whether the event was merely caused by noise on communication link or bus 14. If so, communication circuit 12 may signal wakeup detector 160 (via a link or mechanism, not shown), and wakeup detector 160 may cause communication circuit 12 to again enter the low-power or powered-down state, until wakeup detector 160 detects another event that the communication circuitry should process.

If, however, the event was not caused by noise, then communication circuit 12 processes the event, for example, by determining the type of event, and taking further actions, such as receiving information, sending information, and the like, as persons of ordinary skill in the art will understand.

During the normal mode of operation, communication circuit 12 consumes more power than it does during the low-power or powered-down mode, as more devices, circuits, and/or blocks are powered up and operating. Thus, use of wakeup detector 160 provides an advantage by allowing such devices, circuits, and/or blocks to be placed in a low-power or powered-down state or mode.

As noted above, wakeup detection may be applied to USB communications. In exemplary embodiments, wakeup detections may be applied to USB communications by USB hosts, USB devices, or both, as desired.

Figure 11:
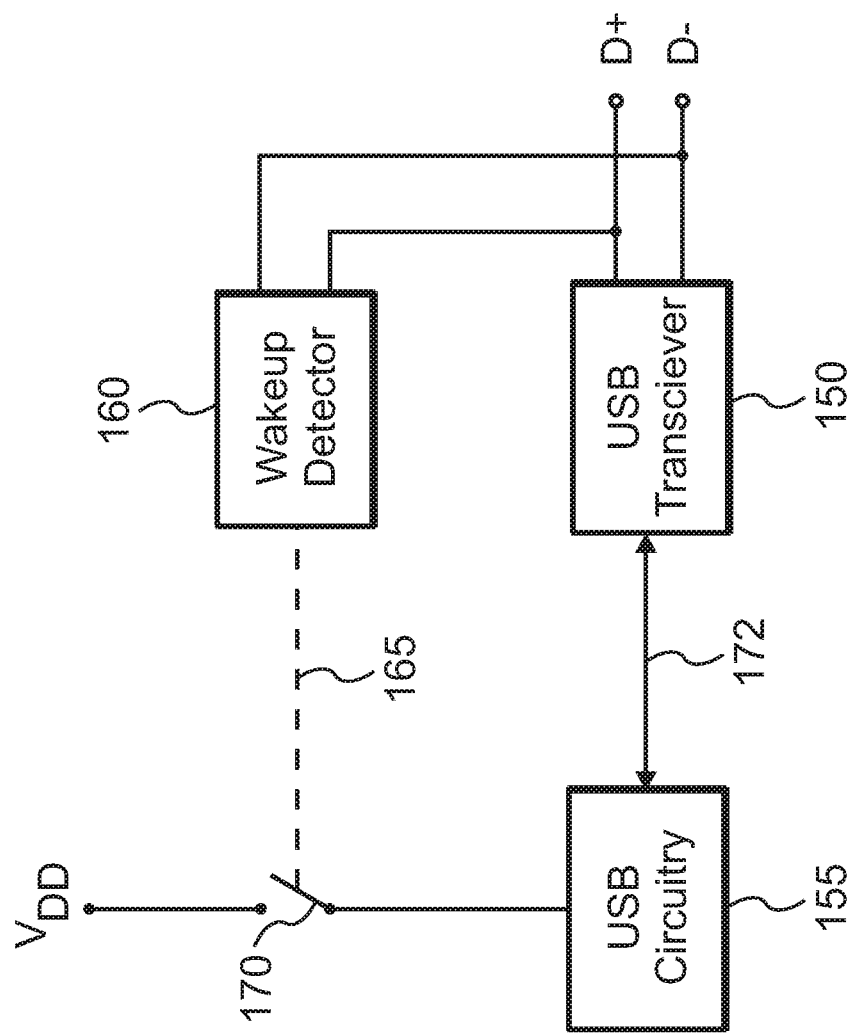
FIG. 11 illustrates a circuit arrangement for information communication using a wakeup detector according to another exemplary embodiment.

FIG. 11 depicts a circuit arrangement for USB communication using a wakeup detector according to an exemplary embodiment. The circuit arrangement in FIG. 11 includes wakeup detector 160, USB transceiver 150, and USB circuitry 155. USB circuitry 155 is similar to communication circuit 12 in FIG. 10, but is configured or designed to facilitate USB communication.

Referring to FIG. 11, USB transceiver 150 facilitates communication via the USB bus, i.e., the D+ and D− signals. In exemplary embodiments, USB transceiver 150 may include differential receivers, single-ended receivers, or both, for instance, as described above with respect to FIG. 5.

Referring again to FIG. 11, USB transceiver communicates with USB circuitry 155 via bus or link 172. Through bus or link 172, USB transceiver 150 may send information to, and receive information from, USB circuitry 155. For example, USB transceiver 150 may provide the values of the D+ and D− signals to USB circuitry 155 via bus or link 172. As another example, USB circuitry 155 may provide control or handshaking or status signals to USB transceiver 150 via bus or link 172.

Wakeup detector 160 monitors USB signals D+ and D−. As described above, when it detects an event that USB circuitry 155 should process, wakeup detector 160 closes switch 170. As a result, power is applied to USB circuitry 155 by application of supply voltage $V_{DD}$. Consequently, USB circuitry 155 leaves the powered-down or low-power state (wakes up), and enters the normal mode of operation. In another embodiment, wakeup detector 160 may monitor outputs of USB transceiver 150 (e.g., as communicated via link 172) in addition to, or instead of, USB signals D+ and D−. In yet another embodiment, USB transceiver 150 may also enter and leave a powered-down or low-power state (as opposed to a normal state or normal mode of operation) as controlled by wakeup detector 160.

In exemplary embodiments, wakeup detector 160 may wake up USB circuitry 155 in response to one or more types of events, such as the detection of one or more of the following: (a) USB EOP condition (EOP_detect); (b) a USB idle condition (Idle_detect); (c) a USB non-idle condition (NOT(Idle_detect)); (d) a USB resume condition (Resume_detect); and (e) a USB SRP detect (SRP_detect or SRP_out). (SRP is an acronym for Session Request Protocol, as prescribed by the applicable USB specifications, as persons of ordinary skill in the art will understand.)

An EOP_detect event may occur when wakeup detector 160 detects the end of a USB packet. An Idle_detect event may occur when wakeup detector 160 detects an idle condition on the USB signals D+ and D−, for instance, when the D+ has a logic-high state and D− signal has a logic-low state for 8 bit times. A Resume_detect event may occur when wakeup detector 160 detects that normal mode of operation of USB circuitry 155 is sought to be resumed or started. An SRP_detect (or SRP_out) event occurs when wakeup detector 160 detects a pulse on the D+ signal line, and wakes up USB circuitry 155 to time the SRP pulse.

In some embodiments, to be detected as a valid SRP pulse, the pulse on the D+ signal should have a width of between 4.95 ms and 9.95 ms. Of course, as persons of ordinary skill in the art will understand, other values of pulse-width may be used, depending on the level of desired tolerance, type of communication, available circuit technology, component tolerance, etc.

In addition, or instead of, one or more of the USB events described above, other events may be included, as persons of ordinary skill in the art will understand. The choice of event(s) depends on a variety of factors, such as design and performance specifications, the type of communication desired or involved, the level and depth of power savings desired, and the like, as persons of ordinary skill in the art will understand.

Once USB circuitry 155 is woken up, i.e., enters the normal mode of operation, it processes the event that gave rise to its being taken out of the low-power or powered-down state. For example, as described above in detail, USB circuitry 155 may determine whether the event was merely caused by noise, whether the event constitutes a valid event (e.g., not caused by noise and meets one or more conditions or criteria), and take appropriate action.

In exemplary embodiments, switch 170 may be implemented in a number of ways, as desired. For example, in some embodiments, switch 170 may constitute a transistor, such as a MOSFET. Other types of switch or transistor or semiconductor device(s) may be used, as desired, as persons of ordinary skill in the art will understand.

Figure 12:
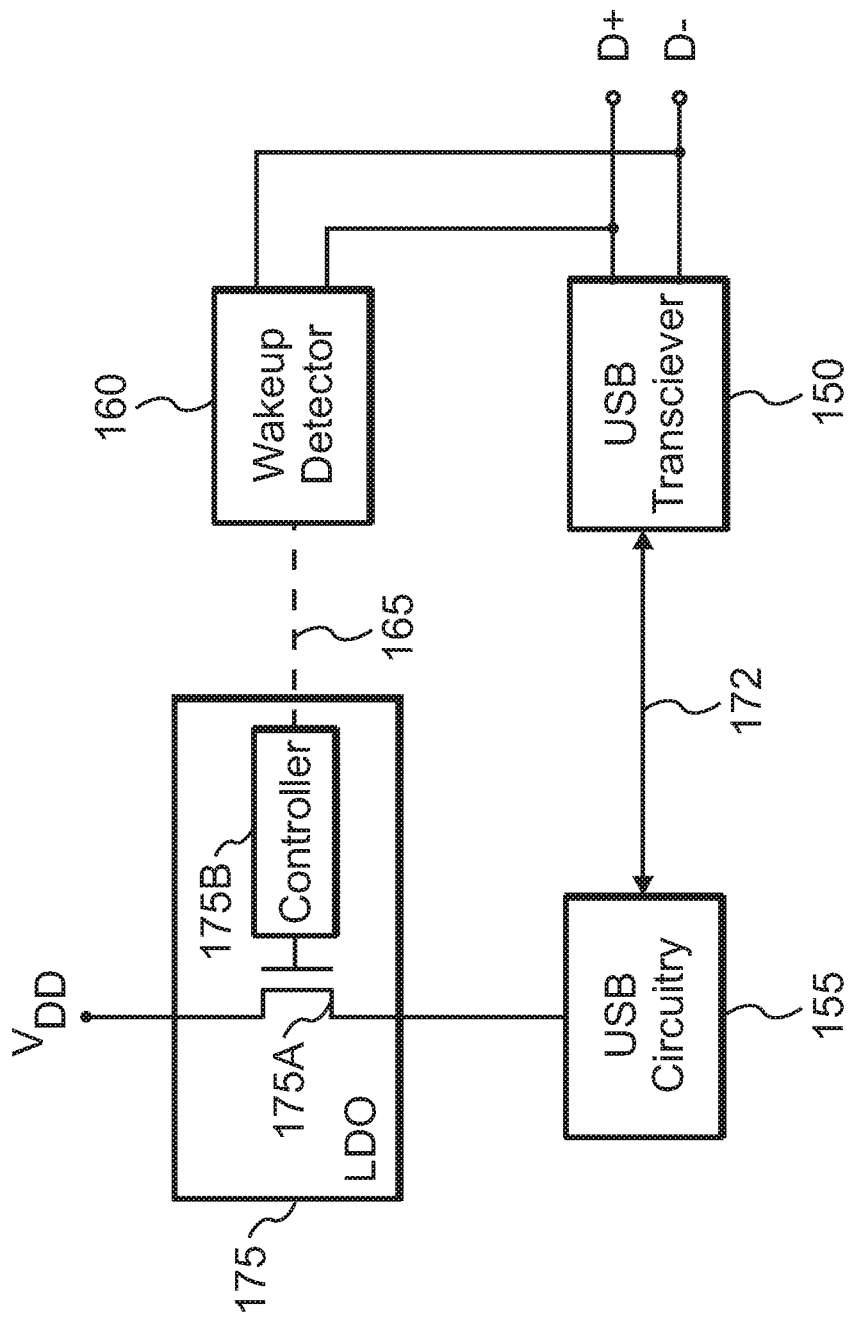
FIG. 12 shows a circuit arrangement for information communication using a wakeup detector according to another exemplary embodiment.

Rather than using a switch, other circuit arrangements may be used to power and power down USB circuitry 155. FIG. 12 shows a circuit arrangement according to an exemplary embodiment that uses a low drop-out regulator (LDO) 175.

More specifically, the circuit arrangement in FIG. 12 may be used in situations where USB circuitry 155 is specified to operate from a voltage that is less than the supply voltage $V_{DD}$. In such a situation, LDO 175 may be used to derive the supply voltage of USB circuitry 155 from the supply voltage $V_{DD}$.

In the embodiment shown, LDO 175 includes pass transistor 175A and controller 175B. By sending an appropriate signal to controller 175B, wakeup detector 160 can cause controller 175B to turn on or turn off pass transistor 175A. Consequently, the supply voltage of USB circuitry 155 may be enabled or disabled, respectively, i.e., USB circuitry 155 may operate in the normal mode of operation or may be powered down.

Note that the circuit arrangement shown uses an LDO as merely one example of a regulator. As persons of ordinary skill in the art will understand, other types of regulator may be used, as desired. Generally, a voltage regulator that can provide a desired supply voltage at a desired supply current to USB circuitry 155 may be used. The choice of regulator depends on the voltage levels, current levels, and power levels involved, available technology (e.g., transistors and other devices), cost, integrated circuit (IC) area, and the like.

Figure 13:
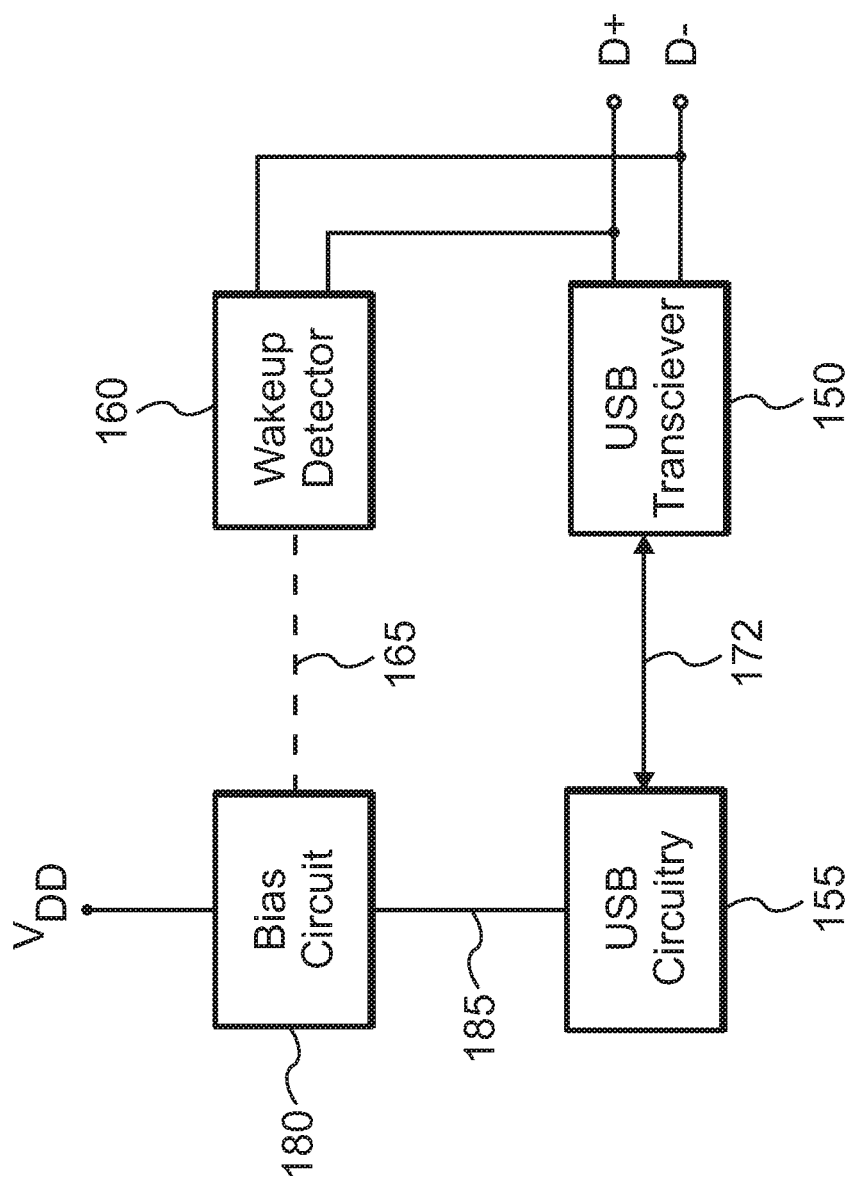
FIG. 13 illustrates a circuit arrangement for information communication using a wakeup detector according to another exemplary embodiment.

In some embodiments, the bias voltages or currents used in or supplied to USB circuitry 155 may be modified in order to place USB circuitry 155 in the normal mode of operation or in the powered-down or low-power state. FIG. 13 shows a circuit arrangement according to an exemplary embodiment that uses a bias circuit 180 to provide one or more bias signals to USB circuitry 155.

More specifically, bias circuit 180 may provide voltage and/or current signals that USB circuitry 155 uses to provide biasing to various devices and circuits in USB circuitry 155. Bias circuit 180 provides the voltage and/or current signals to USB circuitry 155 under the control of wakeup detector 160.

For example, in some embodiments, bias circuit 180 provides one or more current signals that USB circuitry 155 uses as reference current(s) in one or more current mirror(s). As another example, in some embodiments, bias circuit 180 provides one or more voltage signals that USB circuitry 155 uses to bias one or more devices or circuits.

As another example, in some embodiments, bias circuit 180 may provide one or more signals that USB circuitry 155 uses to apply body biases to one or more MOSFETs used to implement USB circuitry 155. By changing the body biases of the MOSFET(s), the MOSFET(s) may be turned on, or off, or their drive level or conduction current modified. Note that the biasing arrangements described above may be combined, as desired. Furthermore, note that other arrangements are possible and contemplated, as persons of ordinary skill in the art will understand.

By controlling the amount or level of the bias signal(s) provided to USB circuitry 155 via bias circuit 180, wakeup detector 160 can cause USB circuitry 155 to operate in the normal mode of operation or to be powered down or placed in a low-power state. By selecting appropriate types and levels of bias signals, the circuitry in USB circuitry 155 may be caused to turn off, or to operate with reduced power consumption (compared to the normal mode of operation). Thus, the level of power consumption reduction by USB circuitry 155 may be selected and/or changed in a flexible manner.

Referring to FIGS. 10-13, generally speaking, a power control circuit may be used to selectively supply power to communication circuit 12 (or to USB circuitry 155). In the embodiments shown, the power control circuit may constitute a switch (FIGS. 10-11); a regulator, such as an LDO (FIG. 12); or a bias circuit (FIG. 13). Other types of devices, circuits, subsystems, or blocks may be used as a power control circuit to control the transition of communication circuit 12 (or to USB circuitry 155) between the normal and low-power or power-down states, as persons of ordinary skill in the art will understand.

Figure 14:
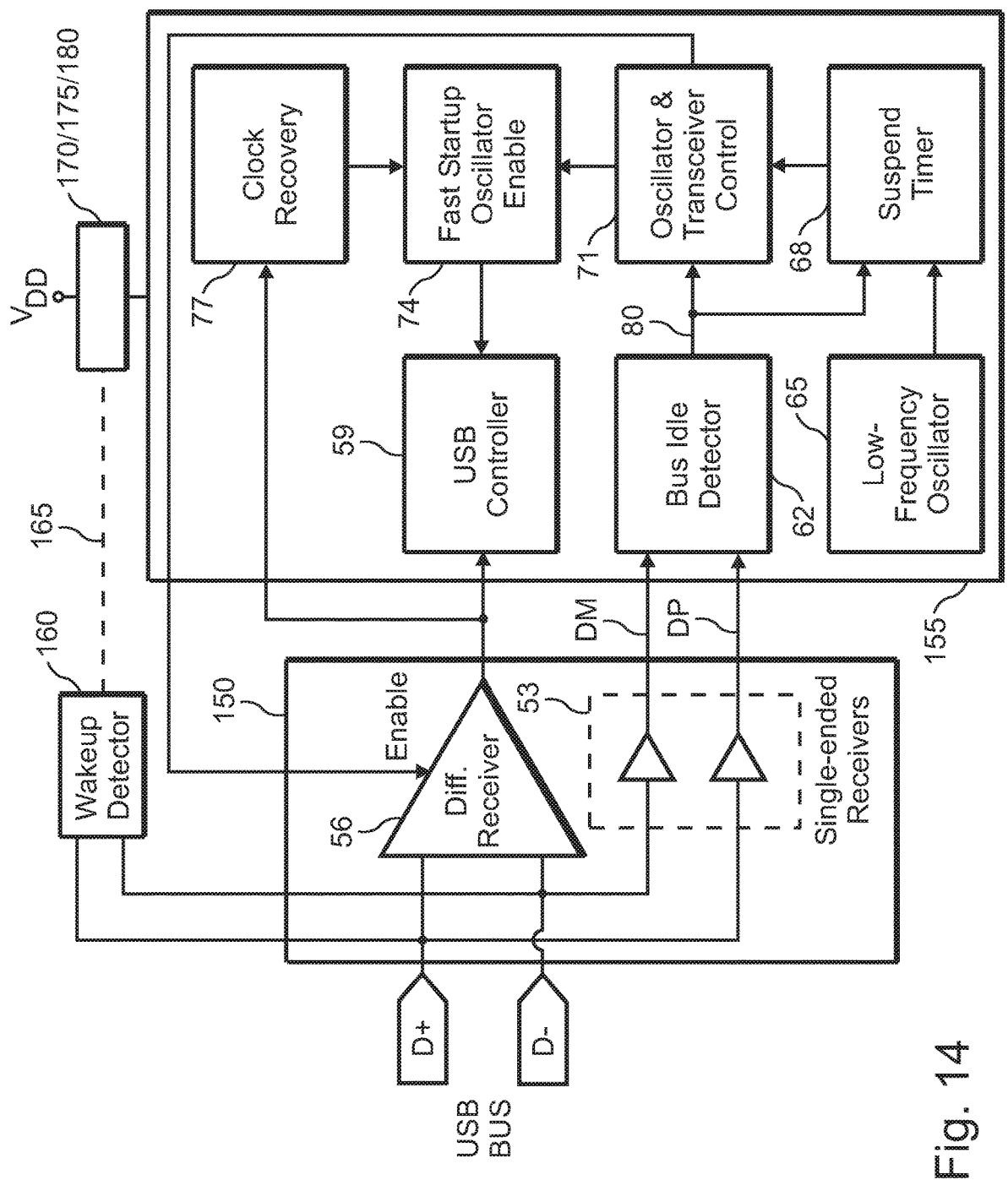
FIG. 14 depicts a circuit arrangement for USB communication using a wakeup detector according to an exemplary embodiment.

The wakeup detection concept for reduced power consumption may be applied to a variety of circuit arrangements for USB communication. For example, the wakeup detection concept may be applied to the circuit arrangement for USB communication shown in FIG. 5. FIG. 14 illustrates such an arrangement according to an exemplary embodiment.

More specifically, in the circuit arrangement shown in FIG. 13, USB transceiver 150 includes single-ended receivers 53 and differential receiver 56. Furthermore, USB circuitry 155 includes USB controller 59, bus idle detector circuit 62, low-frequency oscillator 65, suspend timer circuit 68, oscillator and transceiver control circuit 71, oscillator 74, and clock recovery circuit 77.

Wakeup detector 160 controls the mode or state of USB circuitry 155, as described above in detail. For example, in some embodiments, a switch 170 may be used, as described above. As another example, in some embodiments, an LDO 175 (or other type of regulator) may be used, as described above. As another example, in some embodiments, a bias circuit 180 may be used, as described above.

In exemplary embodiments, wakeup detector 160 may be implemented in a variety of ways. Given that wakeup detector 160 is ordinarily powered (while, for example, USB circuitry 155 is not or is in a low-power state), an implementation with relatively few devices and/or relatively small power consumption (compared to the rest of the USB communication circuit or a block, circuit, subsystem, etc., in which the USB communication circuit is included) helps reduce the overall power consumption.

Figure 15:
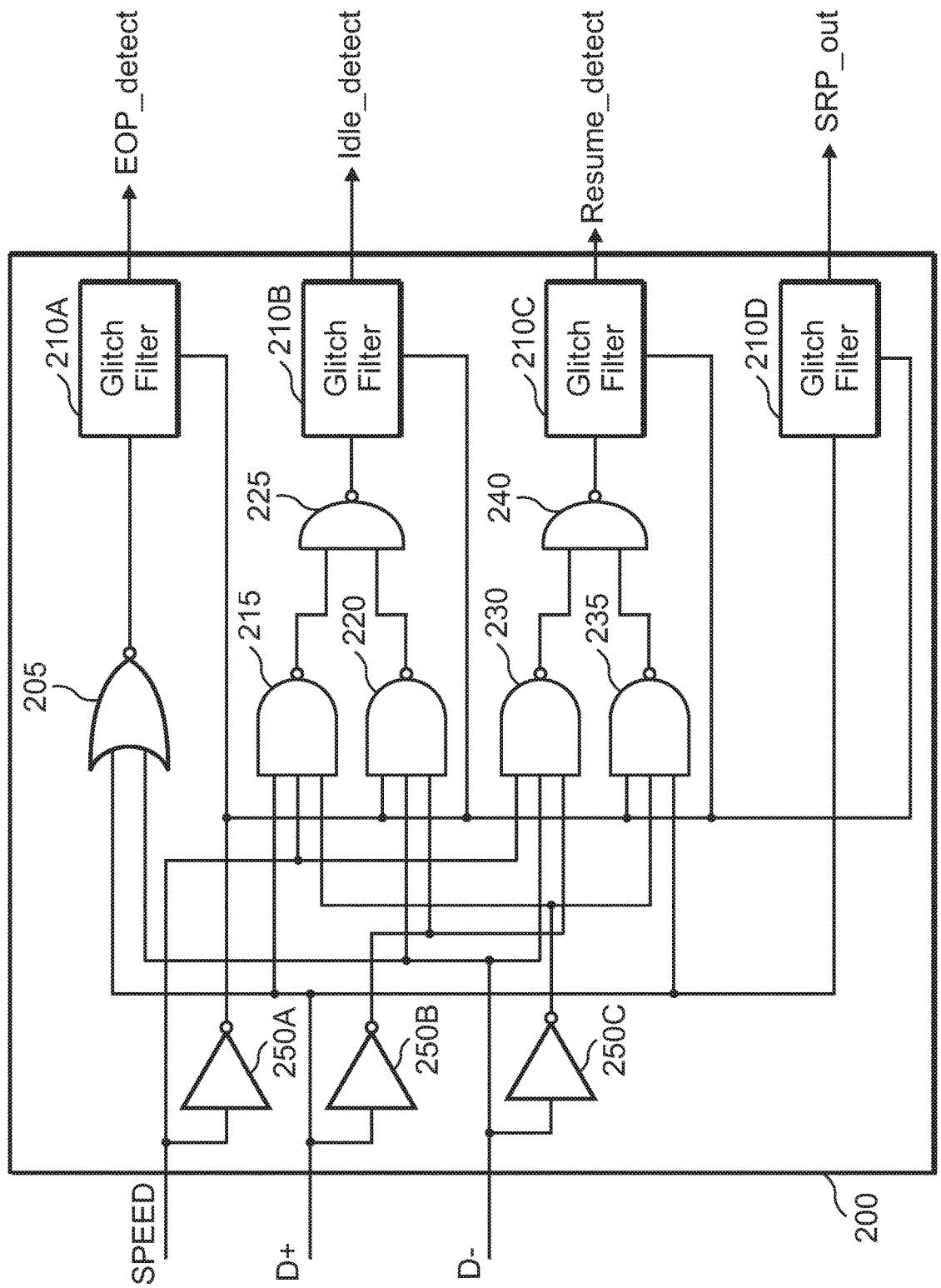
FIG. 15 shows a circuit arrangement for wakeup detection according to an exemplary embodiment.

FIG. 15 shows a circuit arrangement 200 for wakeup detection according to an exemplary embodiment. More specifically, circuit arrangement 200 includes relatively simple combinational digital logic circuitry and glitch filters 210A-210D. The combinational digital logic circuitry generates signals based on the SPEED (described above), D+ and D− signals. Glitch filters 210A-210B "de-glitch" the signals from the combinational digital logic circuitry, i.e., they remove any glitches, e.g. events shorter than a given duration (the duration may depend on various events (e.g., Idle_detect, etc.), as desired), from those signals.

Inverters 250A-250C provide complements of signals SPEED, D+, and D−, respectively. The complements of signals SPEED, D+, and D− are used along with the true (non-complement) versions of those signals to generate signals corresponding to events for which USB circuitry 155 (or generally communication circuit 12) should be woken up, i.e., EOP_detect, Idle_detect, Resume_detect, and SRP_out, as described above.

The operation of circuit arrangement 200 is relatively straightforward, as persons of ordinary skill in the art will understand. To generate an EOP_detect signal, NOR gate 205 and glitch filter 210A are used. To generate the Idle_detect signal, NAND gates 215, 220, and 225, and glitch filter 210B are used. The signal Resume_detect is generated by using NAND gates 230, 235, and 240, and glitch filter 210C. Finally, the SRP_out signal is generated by using glitch filter 210D to delay the D+ signal.

One or more wakeup signals (e.g., used to control switch 170, LDO 175, or bias circuit 180) may derived by performing a desired logic operation on the signals EOP_detect, Idle_detect, Resume_detect, and SRP_out. Generally, the logic operation may constitute an AND operation, an OR operation, a NOT operation (logical inversion), or a combination of AND, OR, and NOT operations.

The choice of logic operation depends on the condition upon which one wishes to wake up USB circuitry 155 (or generally communication circuit 12), as persons of ordinary skill in the art will understand. For example, in some embodiments, an OR operation may be performed on the signals EOP_detect, Idle_detect, Resume_detect, and SRP_out. In such a scenario, the assertion of any of the signals (e.g., an EOP event or an SRP event) will cause USB circuitry 155 to be woken up.

Figure 16:
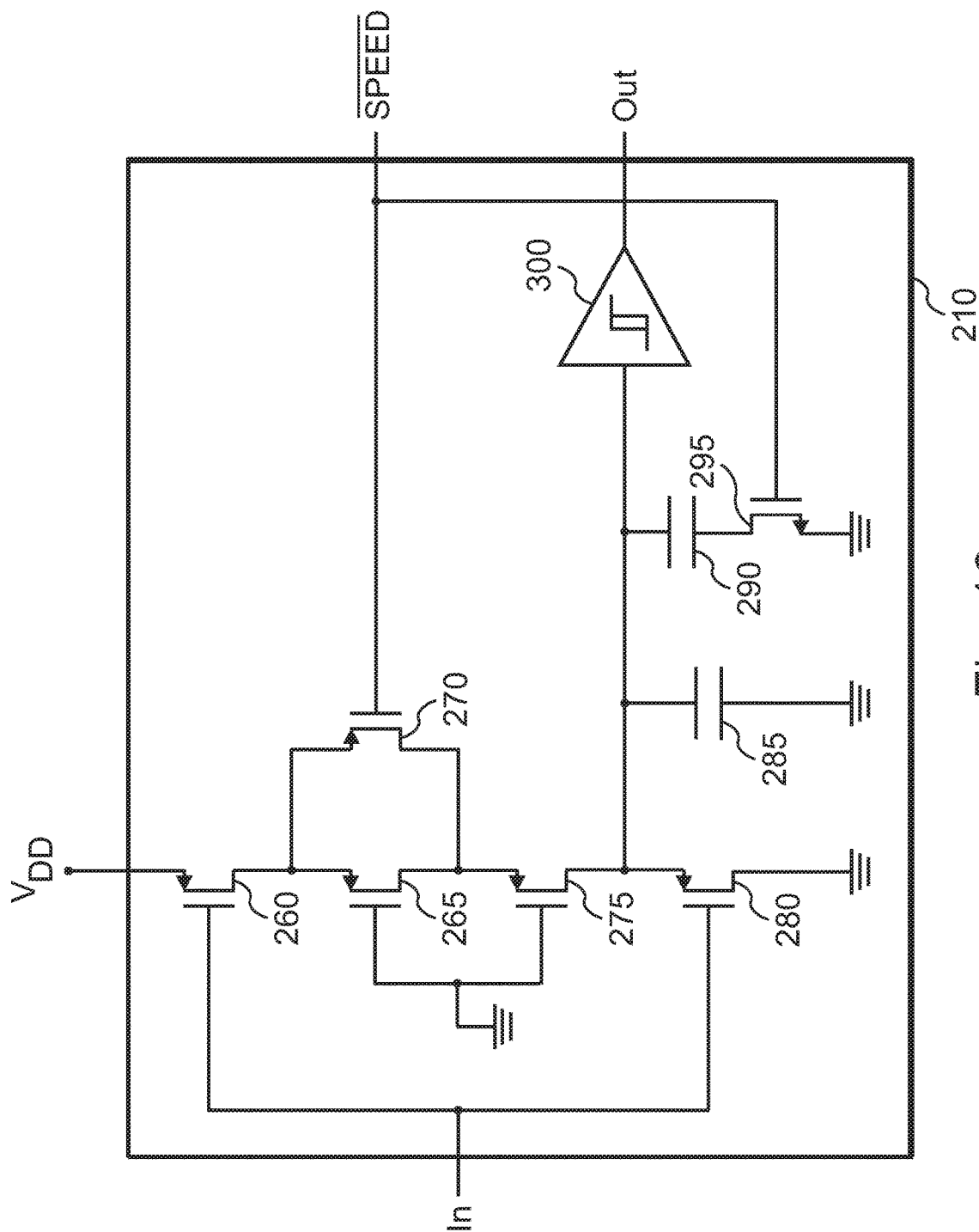
FIG. 16 illustrates a circuit arrangement for implementing a glitch filter according to an exemplary embodiment.

Glitch filters 210A-210D may be implemented in a variety of ways, as persons of ordinary skill in the art will understand. FIG. 16 illustrates a circuit arrangement for implementing glitch filters 210A-210D according to an exemplary embodiment. In other words, the figure shows a circuit arrangement for a glitch filter 210. The circuit may be modified (e.g., by changing one or more capacitance or resistance values to modify the overall delay) to implement glitch filters 210A-210D with a desired pulse duration rejection property.

Glitch filter 210 includes an inverter (with an added configurable resistor) and a Schmitt buffer 300. The inverter includes transistors 260 and 280. In addition, transistors 265 and 275 are coupled in series with p-channel transistor 260. The gates of transistors 265 and 275 are coupled to ground, causing them to turn on when the supply voltage is applied. Thus, transistors 265 and 275 add a resistance to the resistance of transistor 260.

Transistor 270 is coupled in parallel with transistor 265. The complement of the SPEED signal drives the gate of transistor 270. Thus, when the SPEED signal has a logic high value, transistor 270 turns on. As a result, the overall resistance between the supply node and the drain of transistor 280 is reduced by virtue of introducing a parallel current path through transistor 270. As a result, the overall rejection time of glitch filter 210 is reduced.

Conversely, when the SPEED signal has a logic low value, transistor 270 turns off. Consequently, the overall resistance between the supply node and the drain of transistor 280 is dictated by the resistance of transistors 260, 265, and 275. Compared to the case when transistor 270 is turned on, the overall rejection time of glitch filter 210 increases.

Capacitor 285 is coupled across transistor 280, i.e., at the output of the inverter. Thus, capacitor 285 causes an exponential transition at the output of the inverter, i.e., introduces a delay. The series combination of capacitor 290 and transistor 295 is also coupled at the output of the inverter, i.e., across the drain and source of transistor 280. The complement of the SPEED signal drives the gate of transistor 295.

When the SPEED signal has a logic high value, transistor 295 turns on. As a result, the overall capacitance at the output of the inverter (between the source and drain of transistor 280) is increased to the sum of the capacitances of capacitor 285 and capacitor 290. As a result, the overall rejection time of glitch filter 210 increases.

Conversely, when the SPEED signal has a logic low value, transistor 295 turns off. Consequently, the overall capacitance between the source and drain nodes of transistor 280 is dictated mainly by capacitor 285, as transistor 295 isolates capacitor 290 from the output of the inverter. Compared to the case when transistor 295 is turned on, the overall rejection time of glitch filter 210 is reduced. Thus, by changing the logic value of the SPEED signal, the overall rejection time of glitch filter 210 may be changed.

Schmitt buffer 300 reduces the transition time of the output signal of the inverter. In other words, by virtue of adding transistors 265 and 275 and capacitors 285 and 290, the output of the inverter normally rises or falls in an exponential manner (i.e., with a resistor-capacitor (RC) time-constant that depends on transistors 265 and 275 and capacitors 285 and 290). Schmitt buffer 300 produces an output signal in response to the output signal of the inverter.

The output signal of Schmitt buffer 300, however, has a shorter transition time than does the output signal of the inverter. As a result, any logic circuit or device coupled to the output of glitch filter 210 would be able to more quickly and more reliably (e.g., avoid meta-stability) resolve signals that depend on the logical value of the output signal of glitch filter 200.

In the embodiment shown, capacitors 285 and 290 are fixed capacitors. In some embodiments, capacitor 285 and/or capacitor 290 may be variable (e.g., by using a set of capacitors with a corresponding set of switches (e.g., MOSFETs) that allow selectively shorting one or more of the capacitors). Variable capacitor 285 and/or variable capacitor 290 would allow for a larger, configurable range in the overall rejection time of glitch filter 210.

Although some disclosed embodiments relate to low-speed and full-speed USB communications, persons of ordinary skill in the art will understand that other communication apparatus and methods, including high-speed USB, are contemplated within the scope of the disclosure. In particular, high-speed USB uses similar signaling nomenclature and protocols to communicate between devices. For example, high-speed USB uses J and K signaling states (which are defined as the state of transmitted currents into termination impedances, rather than transmitted voltages), and transmits packets starting with synchronization patterns.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. An apparatus comprising:
a communication circuit coupled to a communication link, the communication circuit having a first state and a second state, wherein a power consumption of the communication circuit is lower in the second state than in the first state, the communication circuit comprising an oscillator that provides at least one timing signal, wherein the oscillator is disabled when the communication link is in an idle state before the communication circuit enters a suspend state;
a wakeup detector, coupled to the communication link, to generate a wakeup signal to cause the communication circuit to make a transition from the second state to the first state in response to an occurrence of an event on the communication link; and
a power control circuit to selectively supply power to the communication circuit in response to the wakeup signal.

2. The apparatus according to claim 1, wherein the first state comprises a normal state of the communication circuit in which the communication circuit communicates via the communication link.

3. The apparatus according to claim 1, wherein the second state comprises a low-power state or a powered-down state.

4. The apparatus according to claim 1, wherein the power control circuit comprises a switch, a regulator, or a bias circuit.

5. The apparatus according to claim 1, wherein the power control circuit comprises a low dropout regulator, comprising a controller and a transistor, wherein the controller turns the transistor on or off in response to the wakeup signal.

6. The apparatus according to claim 1, wherein the wakeup detector generates the wakeup signal as a function of states of signals of the communication link.

7. The apparatus according to claim 6, wherein the wakeup detector comprises:
a set of logic gates to generate a set of logic signals in response to the states of the signals of the communication link;
a set of glitch filters coupled to the set of logic gates to filter the set of logic signals to provide a set of filtered signals; and
a logic gate coupled to receive the filtered signals and to provide the wakeup signal.

8. The apparatus according to claim 1, wherein the communication link communicates universal serial bus (USB) packets, and wherein the communication circuit comprises USB circuitry to process the USB packets.

9. The apparatus according to claim 8, wherein the event comprises: (a) a USB end of packet condition; (b) a USB idle condition; (c) a USB resume condition; or (d) a USB Session Request Protocol condition.

10. A communication apparatus, comprising:
a universal serial bus (USB) transceiver coupled to a USB communication link that communicates USB signals;
USB circuitry coupled to the USB transceiver to process the USB packets, the USB circuitry having a first state and a second state, wherein a power consumption of the USB circuitry is lower in the second state than in the first state, the USB circuitry comprising an oscillator that provides at least one timing signal, wherein the oscillator is disabled when the USB communication link is in an idle state before the USB circuitry enters a suspend state;
a wakeup detector, coupled to the USB communication link, to detect an occurrence of an event from the USB signals and to generate a wakeup signal; and
a power control circuit to selectively supply power to the USB circuitry in response to the wakeup signal.

11. The communication apparatus according to claim 10, wherein the first state comprises a normal state of the USB circuitry in which the USB circuitry processes USB packets communicated via the USB communication link; and wherein the second state comprises a low-power state or a powered-down state.

12. The communication apparatus according to claim 10, wherein the power control circuit comprises: (a) a switch; (b) a voltage regulator; or (c) a bias circuit.

13. The communication apparatus according to claim 10, wherein the event comprises: (a) a USB end of packet condition; (b) a USB idle condition; (c) a USB resume condition; or (d) a USB Session Request Protocol condition.

14. The communication apparatus according to claim 10, wherein the wakeup detector comprises:
digital logic circuitry to generate a set of logic signals in response to the USB signals and a speed-selection signal;
a set of glitch filters to receive the set of logic signals and to generate a set of output signals; and
a logic gate to generate the wakeup signal in response to the set of output signals.

15. A method of operating a communication circuit coupled to a communication link, the communication circuit having a first state and a second state, wherein a power consumption of the communication circuit is lower in the second state than in the first state, the method comprising:
enabling an oscillator to provide the timing signal when the communication link is in a non-idle state; and
disabling the oscillator when the communication link is in an idle state before the second device enters a suspend state;
causing the communication circuit to enter the second state by controlling a supply of power to the communication circuit;
examining signals of the communication link to determine whether an event has occurred; and
controlling the supply of power to the communication circuit to cause the communication circuit to make a transition from the second state to the first state if the event has occurred.

16. The method according to claim 15, wherein the first state comprises a normal state of the communication circuit in which the communication circuit processes information communicated via the communication link; and wherein the second state comprises a low-power state or a powered-down state.

17. The method according to claim 15, wherein controlling the supply of power to the communication circuit to cause the communication circuit to make a transition from the second state to the first state if the event has occurred further comprises using a switch, a regulator, or a bias circuit to control the supply of power to the communication circuit.

18. The method according to claim 15, wherein the communication link communicates universal serial bus (USB) packets, and wherein the communication circuit comprises USB circuitry to process the USB packets.

19. The method according to claim 15, wherein the event comprises: (a) a USB end of packet condition; (b) a USB idle condition; (c) a USB resume condition; or (d) a USB Session Request Protocol condition.

20. The method according to claim 15, wherein examining signals of the communication link to determine whether an event has occurred further comprises:
   generating a set of logic signals in response to signals of the communication link and in response to a speed selection signal;
   filtering the logic signals to generate a set of filtered signals; and
   determining if the event has occurred by performing a logic operation on the filtered signals.

\* \* \* \* \*